United States Patent
Nadehara

(10) Patent No.: US 7,809,132 B2
(45) Date of Patent: Oct. 5, 2010

(54) IMPLEMENTATIONS OF AES ALGORITHM FOR REDUCING HARDWARE WITH IMPROVED EFFICIENCY

(75) Inventor: Kouhei Nadehara, Tokyo (JP)

(73) Assignee: NEC Corporation, Tokyo (JP)

( * ) Notice: Subject to any disclaimer, the term of this patent is extended or adjusted under 35 U.S.C. 154(b) by 1785 days.

(21) Appl. No.: 10/764,504

(22) Filed: Jan. 27, 2004

(65) Prior Publication Data

US 2004/0184602 A1    Sep. 23, 2004

(30) Foreign Application Priority Data

Jan. 28, 2003   (JP)   ............... 2003-018845

(51) Int. Cl.
*H04K 1/00*   (2006.01)
*H04K 1/04*   (2006.01)
*H04K 1/06*   (2006.01)
*H04L 9/00*   (2006.01)
*H04L 9/28*   (2006.01)
*H04L 9/30*   (2006.01)

(52) U.S. Cl. .............................. 380/28; 380/29; 380/37
(58) Field of Classification Search ............. 380/28–30, 380/37
See application file for complete search history.

(56) References Cited

U.S. PATENT DOCUMENTS 6,259,790 B1 *   7/2001   Takagi et al. ................... 380/30

2003/0198345 A1 *   10/2003   Van Buer ..................... 380/43

FOREIGN PATENT DOCUMENTS

| JP | 63-186338 A | 8/1988 |
| JP | 11-249921 A | 9/1999 |
| JP | 2000-322280 A | 11/2000 |
| JP | 2002-23999 A | 1/2002 |
| JP | 2003-15522 A | 1/2003 |
| JP | 2003-195749 A | 7/2003 |

OTHER PUBLICATIONS

Federal Information Processing Standards Publication 197, Announcing the Advanced Encryption Standard (AES), Nov. 26, 2001, pp. 1-51.

(Continued)

*Primary Examiner*—Kimyen Vu
*Assistant Examiner*—Randal D Moran
(74) *Attorney, Agent, or Firm*—Sughrue Mion, PLLC

(57) ABSTRACT

An AES encryption processor is provided for reducing hardware with improved throughput. The processor is composed of a selector unit selecting an element of a state in response to row and column indices, a S-box for obtaining a substitution value with said selected element used as an index, a coefficient table providing first to fourth coefficients in response to said row index, first to fourth Galois field multiplexers respectively computing first to fourth products, which are obtained by multiplication of said substitution value with first to fourth coefficients, respectively, and an accumulator which accumulates the first to fourth products to develop first to fourth elements of a designated column of a resultant state.

18 Claims, 23 Drawing Sheets

OTHER PUBLICATIONS

H. Seike et al., "Trial product of the AES cryptography using FPGA", The Institute of Electronics, Information and Communication Engineers, Technical Report of IEICE, VLD2001-91, ICD2001-136, FTS2001-38, Nov. 2001.

P. Schaumont et al., "Unlocking the Design Secrets of a 2.29 Gb/s Rijndael Processor", Design Automation Conference, 2002. Proceeding, $39^{th}$ 2002, pp. 634-639.

M. McLoone et al., "Rijndael FPGA Implementation Utilizing Look-Up Tables", Signal Processing Systems, 2001 IEEE Workshop, pp. 349-360.

Implementations of AES (Rijndael) in C/C++ and Assembler, "Aescrypt.asm", Jan. 21, 2003, pp. 1-11.

* cited by examiner

| ROW INDEX | OUTPUT OF COEFFICIENT TABLE | | | |
|---|---|---|---|---|
| | $d_3$ | $d_2$ | $d_1$ | $d_0$ |
| 0 | {02} | {01} | {01} | {03} |
| 1 | {03} | {02} | {01} | {01} |
| 2 | {01} | {03} | {02} | {01} |
| 3 | {01} | {01} | {03} | {02} |

Fig. 12

| imm | bo3 | bo2 | bo1 | bo0 |
|---|---|---|---|---|
| | | rt | | |
| 00 | S-BOX(bi0)·{02} | S-BOX(bi0)·{01} | S-BOX(bi0)·{01} | S-BOX(bi0)·{03} |
| 01 | S-BOX(bi1)·{03} | S-BOX(bi1)·{02} | S-BOX(bi1)·{01} | S-BOX(bi1)·{01} |
| 02 | S-BOX(bi2)·{01} | S-BOX(bi2)·{03} | S-BOX(bi2)·{02} | S-box(bi2)·{01} |
| 03 | S-BOX(bi3)·{01} | S-BOX(bi3)·{01} | S-BOX(bi3)·{03} | S-BOX(bi3)·{02} |

Fig. 13

```
; INPUT:
; r0=[S3,0  S2,0  S1,0  S0,0]
; r1=[S3,1  S2,1  S1,1  S0,1]
; r2=[S3,2  S2,2  S1,2  S0,2]
; r3=[S3,3  S2,3  S1,3  S0,3]
;
; WORK REGISTER:r4
; ACCUMULATOR REGISTER:r5
;
;
; OUTPUT:
; r5=[S'3,0 S'2,0 S'1,0 S'0,0]
;
;
AES_SSM  r0,r5,0   ; S0,0=r0, bi0
AES_SSM  r1,r4,1   ; S1,1=r1, bi1
XOR      r5,r4,r5  ; r5=r5 XOR r4
AES_SSM  r2,r4,2   ; S2,2=r2, bi2
XOR      r5,r4,r5  ; r5 =r5 XOR r4
AES_SSM  r3,r4,3   ; S3,3=r3, bi3
XOR      r5,r4,r5  ; r5=r5 XOR r4
```

Fig. 14

| ROW INDEX | OUTPUT OF COEFFICIENT TABLE | | | |
|---|---|---|---|---|
| | $d_3$ | $d_2$ | $d_1$ | $d_0$ |
| 0 | {0e} | {09} | {0d} | {0b} |
| 1 | {0b} | {0e} | {09} | {0d} |
| 2 | {0d} | {0b} | {0e} | {09} |
| 3 | {09} | {0d} | {0b} | {0e} |

Fig. 15

| imm | bo3 | bo2 | bo1 | bo0 |
|---|---|---|---|---|
| | | rt | | |
| 00 | INVS-BOX(bi0)·{0e} | INVS-BOX(bi0)·{09} | INVS-BOX(bi0)·{0d} | INVS-BOX(bi0)·{0b} |
| 01 | INVS-BOX(bi1)·{0b} | INVS-BOX(bi1)·{0e} | InvS-box(bi0)·{09} | INVS-BOX(bi1)·{0d} |
| 02 | INVS-BOX(bi2)·{0d} | INVS-BOX(bi2)·{0b} | INVS-BOX(bi2)·{0e} | INVS-BOX(bi2)·{09} |
| 03 | InvS-box(bi3)·{09} | InvS-box(bi3)·{0d} | INVS-BOX(bi3)·{0b} | INVS-BOX(bi3)·{0e} |

Fig. 21

| | | y | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | a | b | c | d | e | f |
| f | 0 | 63 | 7c | 77 | 7b | f2 | 6b | 6f | c5 | 30 | 01 | 67 | 2b | fe | d7 | ab | 76 |
| | 1 | ca | 82 | c9 | 7d | fa | 59 | 47 | f0 | ad | d4 | a2 | af | 9c | a4 | 72 | c0 |
| | 2 | b7 | fd | 93 | 26 | 36 | 3f | f7 | cc | 34 | a5 | e5 | f1 | 71 | d8 | 31 | 15 |
| | 3 | 04 | c7 | 23 | c3 | 18 | 96 | 05 | 9a | 07 | 12 | 80 | e2 | eb | 27 | b2 | 75 |
| | 4 | 09 | 83 | 2c | 1a | 1b | 6e | 5a | a0 | 52 | 3b | d6 | b3 | 29 | e3 | 2f | 84 |
| | 5 | 53 | d1 | 00 | ed | 20 | fc | b1 | 5b | 6a | cb | be | 39 | 4a | 4c | 58 | cf |
| | 6 | d0 | ef | aa | fb | 43 | 4d | 33 | 85 | 45 | f9 | 02 | 7f | 50 | 3c | 9f | a8 |
| | 7 | 51 | a3 | 40 | 8f | 92 | 9d | 38 | f5 | bc | b6 | da | 21 | 10 | ff | f3 | d2 |
| | 8 | cd | 0c | 13 | ec | 5f | 97 | 44 | 17 | c4 | a7 | 7e | 3d | 64 | 5d | 19 | 73 |
| | 9 | 60 | 81 | 4f | dc | 22 | 2a | 90 | 88 | 46 | ee | b8 | 14 | de | 5e | 0b | db |
| | a | e0 | 32 | 3a | 0a | 49 | 06 | 24 | 5c | c2 | d3 | ac | 62 | 91 | 95 | e4 | 79 |
| | b | e7 | c8 | 37 | 6d | 8d | d5 | 4e | a9 | 6c | 56 | f4 | ea | 65 | 7a | ae | 08 |
| | c | ba | 78 | 25 | 2e | 1c | a6 | b4 | c6 | e8 | dd | 74 | 1f | 4b | bd | 8b | 8a |
| | d | 70 | 3e | b5 | 66 | 48 | 03 | f6 | 0e | 61 | 35 | 57 | b9 | 86 | c1 | 1d | 9e |
| | e | e1 | f8 | 98 | 11 | 69 | d9 | 8e | 94 | 9b | 1e | 87 | e9 | ce | 55 | 28 | df |
| | f | 8c | a1 | 89 | 0d | bf | e6 | 42 | 68 | 41 | 99 | 2d | 0f | b0 | 54 | bb | 16 |

Fig. 22

|   | | y | | | | | | | | | | | | | | | |
|---|---|---|---|---|---|---|---|---|---|---|---|---|---|---|---|---|---|
|   |   | 0 | 1 | 2 | 3 | 4 | 5 | 6 | 7 | 8 | 9 | a | b | c | d | e | f |
| f | 0 | 52 | 09 | 6a | d5 | 30 | 36 | a5 | 38 | bf | 40 | a3 | 9e | 81 | f3 | d7 | fb |
|   | 1 | 7c | e3 | 39 | 82 | 9b | 2f | ff | 87 | 34 | 8e | 43 | 44 | c4 | de | e9 | cb |
|   | 2 | 54 | 7b | 94 | 32 | a6 | c2 | 23 | 3d | ee | 4c | 95 | 0b | 42 | fa | c3 | 4e |
|   | 3 | 08 | 2e | a1 | 66 | 28 | d9 | 24 | b2 | 76 | 5b | a2 | 49 | 6d | 8b | d1 | 25 |
|   | 4 | 72 | f8 | f6 | 64 | 86 | 68 | 98 | 16 | d4 | a4 | 5c | cc | 5d | 65 | b6 | 92 |
|   | 5 | 6c | 70 | 48 | 50 | fd | ed | b9 | da | 5e | 15 | 46 | 57 | a7 | 8d | 9d | 84 |
|   | 6 | 90 | d8 | ab | 00 | 8c | bc | d3 | 0a | f7 | e4 | 58 | 05 | b8 | b3 | 45 | 06 |
|   | 7 | d0 | 2c | 1e | 8f | ca | 3f | 0f | 02 | c1 | af | bd | 03 | 01 | 13 | 8a | 6b |
|   | 8 | 3a | 91 | 11 | 41 | 4f | 67 | dc | ea | 97 | f2 | cf | ce | f0 | b4 | e6 | 73 |
|   | 9 | 96 | ac | 74 | 22 | e7 | ad | 35 | 85 | e2 | f9 | 37 | e8 | 1c | 75 | df | 6e |
|   | a | 47 | f1 | 1a | 71 | 1d | 29 | c5 | 89 | 6f | b7 | 62 | 0e | aa | 18 | be | 1b |
|   | b | fc | 56 | 3e | 4b | c6 | d2 | 79 | 20 | 9a | db | c0 | fe | 78 | cd | 5a | f4 |
|   | c | 1f | dd | a8 | 33 | 88 | 07 | c7 | 31 | b1 | 12 | 10 | 59 | 27 | 80 | ec | 5f |
|   | d | 60 | 51 | 7f | a9 | 19 | b5 | 4a | 0d | 2d | e5 | 7a | 9f | 93 | c9 | 9c | ef |
|   | e | a0 | e0 | 3b | 4d | ae | 2a | f5 | b0 | c8 | eb | bb | 3c | 83 | 53 | 99 | 61 |
|   | f | 17 | 2b | 04 | 7e | ba | 77 | d6 | 26 | e1 | 69 | 14 | 63 | 55 | 21 | 0c | 7d |

Fig. 23

|   | y | | | | | | | | | | | | | | | | |
|---|---|---|---|---|---|---|---|---|---|---|---|---|---|---|---|---|---|
|   |   | 0 | 1 | 2 | 3 | 4 | 5 | 6 | 7 | 8 | 9 | a | b | c | d | e | f |
| f | 0 | 00 | 01 | 8d | f6 | cb | 52 | 7b | d1 | e8 | 4f | 29 | c0 | b0 | e1 | e5 | c7 |
|   | 1 | 74 | b4 | aa | 4b | 99 | 2b | 60 | 5f | 58 | 3f | fd | cc | ff | 40 | ee | b2 |
|   | 2 | 3a | 6e | 5a | f1 | 55 | 4d | a8 | c9 | c1 | 0a | 98 | 15 | 30 | 44 | a2 | c2 |
|   | 3 | 2c | 45 | 92 | 6c | f3 | 39 | 66 | 42 | f2 | 35 | 20 | 6f | 77 | bb | 59 | 19 |
|   | 4 | 1d | fe | 37 | 67 | 2d | 31 | f5 | 69 | a7 | 64 | ab | 13 | 54 | 25 | e9 | 09 |
|   | 5 | ed | 5c | 05 | ca | 4c | 24 | 87 | bf | 18 | 3e | 22 | f0 | 51 | ec | 61 | 17 |
|   | 6 | 16 | 5e | af | d3 | 49 | a6 | 36 | 43 | f4 | 47 | 91 | df | 33 | 93 | 21 | 3b |
|   | 7 | 79 | b7 | 97 | 85 | 10 | b5 | ba | 3c | b6 | 70 | d0 | 06 | a1 | fa | 81 | 82 |
|   | 8 | 83 | 7e | 7f | 80 | 96 | 73 | be | 56 | 9b | 9e | 95 | d9 | f7 | 02 | b9 | a4 |
|   | 9 | de | 6a | 32 | 6d | d8 | 8a | 84 | 72 | 2a | 14 | 9f | 88 | f9 | dc | 89 | 9a |
|   | a | fb | 7c | 2e | c3 | 8f | b8 | 65 | 48 | 26 | c8 | 12 | 4a | ce | e7 | d2 | 62 |
|   | b | 0c | e0 | 1f | ef | 11 | 75 | 78 | 71 | a5 | 8e | 76 | 3d | bd | bc | 86 | 57 |
|   | c | 0b | 28 | 2f | a3 | da | d4 | e4 | 0f | a9 | 27 | 53 | 04 | 1b | fc | ac | e6 |
|   | d | 7a | 07 | ae | 63 | c5 | db | e2 | ea | 94 | 8b | c4 | d5 | 9d | f8 | 90 | 6b |
|   | e | b1 | 0d | d6 | eb | c6 | 0e | cf | ad | 08 | 4e | d7 | e3 | 5d | 50 | 1e | b3 |
|   | f | 5b | 23 | 38 | 34 | 68 | 46 | 03 | 8c | dd | 9c | 7d | a0 | cd | 1a | 41 | 1c |

IMPLEMENTATIONS OF AES ALGORITHM FOR REDUCING HARDWARE WITH IMPROVED EFFICIENCY

BACKGROUND OF THE INVENTION

1. Field of the Invention

The present invention is generally related to apparatus and method for implementing encryption and decryption using the AES (advanced encryption standard) algorithm, more particularly, to a technique for reducing hardware used for encrypting and decrypting using the AES algorithm.

2. Description of the Related Art

Inexpensive high-speed Internet access technologies, including optical fiber networks, ADSL (asymmetric digital subscriber line) networks, and cable television networks and so on, promote use of VPN (virtual private network) technologies, which provide secure communications through public communication networks. The use of VPN eliminates the necessity of expensive private links, and preferably reduces communications cost.

Typical VPN technologies adopt the US government's data encryption standard (DES) algorithm, which uses 56-bit common keys, or the Triple-DES algorithm, which uses three passes of the DES algorithms. Nevertheless, these algorithms do not satisfy recent requirements; the DES seems to be no longer sufficient to provide the necessary security, while the Triple-DES requires a large amount of processing.

The AES algorithm, which is based on the Rijndael algorithm, is a promising candidate of the next-generation encryption algorithm for VPN. The security of the AES algorithm is at least as good as the Triple-DES, and superior to it in efficiency. This situation necessitates encryption and decryption platforms adapted to the AES algorithm, including AES-dedicated hardware and software.

Federal Information Processing Standards Publication 197, hereinafter referred to as FIPS 197, the entire disclosure of which is incorporated herein by reference, presents the procedure of implementing the AES algorithm.

The input for the AES algorithm consists of sequences of 128 bits, which are referred to as blocks. The AES algorithm divides the 128-bit input into 16 bytes (each consisting of 8 bits), and arranges the 16 bytes to generate a two-dimensional array of bytes called the state. The state consists of four rows and four columns of bytes. The AES algorithm's operations are performed on states. The input, which is the array of bites $in_0, in_1 \ldots in_{15}$, is copied into the state Array as illustrated in FIG. 1. The (i, j) element of the state is denoted by $S_{i,j}$ for $0 \leq i, j \leq 3$, hereinafter.

FIG. 2 is a flowchart illustrating the encrypting procedure using the AES algorithm, which is described in the pseudo code in FIPS 197.

For encryption, the AES algorithm involves repeatedly implementing a set of transformations called "round". The number of the rounds, which is denoted by Nr, depends on the key lengths. The numbers of rounds for the key lengths of 128, 192, and 256 are 10, 12, and 14, respectively.

Each round is composed of four transformations called "SubBytes", "ShiftRows", "MixColumns", and "AddRoundKey", which are denoted by numerals 1404, 1405, 1406, and 1407, respectively, with exception of the final round 1408, which does not include the MixColumns transformation.

Encryption using the AES algorithm begins with an initial AddRoundKey transformation 1402. After the initial AddRoundKey transformation 1402, the first Nr−1 rounds 1403 are implemented repeatedly, which is followed by the final round 1408.

The following is a brief explanation of the aforementioned four transformations "SubBytes", "ShiftRows", "MixColumns", and "AddRoundKey". Details of these transformations are given in FIPS 197.

The SubBytes transformation 1404 is a byte substitution on each byte of the state using a substitution table called "S-Box". The S-Box, whose contents are disclosed in FIG. 7 of FIPS 197, is constructed by composing two transformations: taking the multiplicative inverse in the Galois field $GF(2^8)$, and applying an affine transformation over the $GF(2^8)$.

In the ShiftRows transformation 1405, the bytes of the last three rows of the state are shifted over different numbers of bytes.

The MixColumns transformation 1406 operates on the state column-by-column, treating each column as a four-term polynomial. The columns are considered as polynomials over $GF(2^8)$ and multiplied with a fixed polynomial.

In the AddRoundKey transformation, a Round Key, which is generated through a key expansion of a common key, is added to the state by a simple bitwise XOR operation.

It should be noted that addition and multiplication in the MixColumns and AddRoundKey transformations are implemented over the Galois field $GF(2^8)$. Adders for implementing addition over $GF(2^8)$, which computes the sum of two GF elements by XORing the corresponding bits, only requires reduced hardware typically including several logic gates. In contrast, multipliers for implementing multiplication over $GF(2^8)$ requires increased hardware, typically including several tens of logic gates.

The SubBytes, ShiftRows, and MixColumns transformations 1404, 1405, and 1406, which are the components of the round, are often performed collectively to improve the throughput. There is a need for providing a method for efficiently performing these transformations for improving efficiency because of the following reasons. The SubBytes and MixColumns transformations require a large amount of processing because the SubBytes transformation includes many table lookups, and the MixColumns transformation includes multiplication over the Galois field $GF(2^8)$. In addition, the ShiftRows and SubBytes transformations can be performed collectively, which desirably improves efficiency. It should be noted that the AddRoundKey transformation is usually performed independently, because of its high simplicity and independence.

FIG. 3 is a signal flow diagram illustrating a conventional method of implementing the SubBytes, ShiftRows, and MixColumns transformations collectively for obtaining the first column of the transformation result, the first column including four elements. The first column of the transformation result is obtained from the state elements $S_{0,0}$, $S_{1,1}$, $S_{2,2}$, and $S_{3,3}$.

Although FIG. 2 illustrates that a round begins with the SubBytes transformation, the method begins with the ShiftRows transformation. It should be noted that the SubBytes, and ShiftRows transformations commute, and thus the same result is obtained regardless of the order in which the SubBytes and ShiftRows transformations are performed.

The ShiftRows transformation is implemented by obtaining the associated elements using table lookups from the state. The MixColumns transformation is achieved by multiplication of the substitution values obtained from the S-box with corresponding coefficients followed by addition 1503, the coefficients being defined as disclosed in FIFP 197 (see formula (5.6)). In FIG. 3, the multiplication over $GF(2^8)$ in hexadecimal notation is denoted by symbols "·{xy}" where xy is a hexadecimal value.

The same goes for the reminder columns of the transformation result. The second column is obtained from the elements $S_{0,1}$, $S_{1,2}$, $S_{2,3}$, and $S_{3,0}$, the third column is obtained from the elements $S_{0,2}$, $S_{1,3}$, $S_{2,0}$, and $S_{3,1}$, and the fourth column is obtained from the elements $S_{0,3}$, $S_{1,0}$, $S_{2,1}$, and $S_{3,2}$.

In order to improve the throughput, conventional hardware for implementing AES rounds is often provided with a plurality of S-boxes to perform parallel processing. For example, Seike et al. discloses a Rijndael processor performing parallel processing of all the 16 elements of the state using 16 S-Boxes having the same content in "Trial produce of the AES cryptography using FPGA," p. 13, Technical Report of IEICE, VLD2001-91, ICD2001-136, PTS2001-38, November 2001. Schaumont et al. discloses a similar Rijndael processor having 16 S-Boxes in "Unlocking the design secrets of a 2.29 Gb/s Rijndael processor," Design Automation Conference, 2002. Proceedings. 39th, 2002, pp. 634-639.

McLoone et al. discloses a look-up table based Rijndael design to achieve an improved speed in Signal Processing Systems, 2001 IEEE Workshop on, 2001, pp. 349-360. The design implements not only the SubBytes transformation but also the ShiftRows and MixColumns transformations as look-up tables (LUTs). FIG. 4 is a signal flow diagram illustrating the procedure of implementing the SubBytes, ShiftRows, and MixColumns transformations for the first column of the transformation result. The design includes additional two further LUTs in place of the Galois field multipliers 1502; one containing the values of the SubBytes LUT multiplied in $GF(2^8)$ by the hexadecimal number "02", the other containing the values of the SubBytes LUT multiplied in $GF(2^8)$ by the hexadecimal number "03". These additional LUTs are used to perform parallel processing.

The round of the AES algorithm may be implemented by software. Gladman discloses a source code for implementing the AES algorithm in "Implementations of AES (Rijndael) in C/C++ and Assembler," http://fp.gladman.plus.com/cryptography_technology/rijndael.

Figure 5:
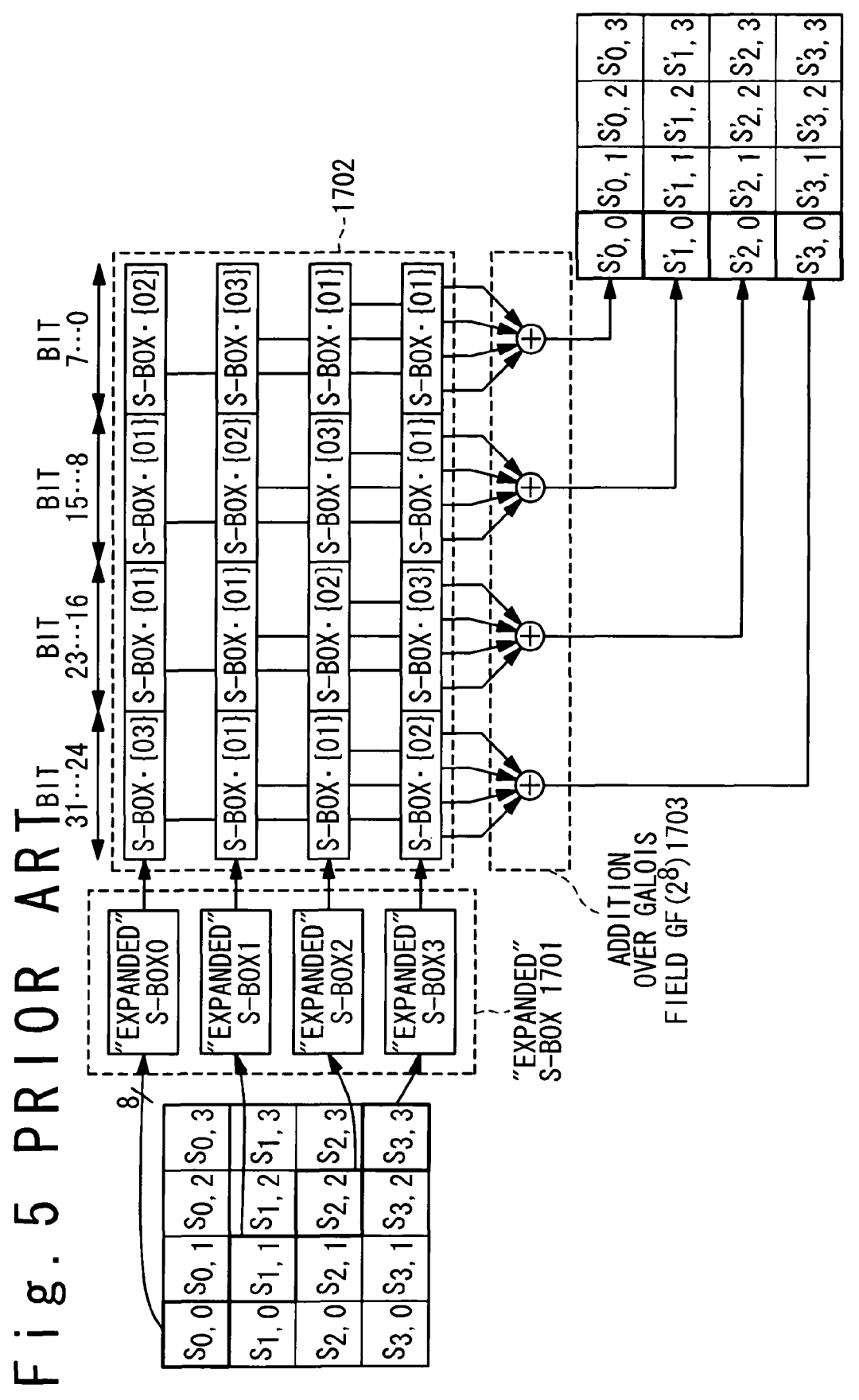

FIG. 5 illustrates the Gladman's method for implementing the round for the AES algorithm. The method involves preparing "expanded" S-Boxes #0 to #3, which consist of 256 32-bit words, in a main memory. Each 32-bit word of the expanded S-Boxes #0 contains bits #0 to #31, wherein the bits #0 to #7 contains the corresponding value of the SubBytes S-box multiplied by the hexadecimal number "02", the bits #8 to #15 contains the corresponding value of the SubBytes S-box multiplied by the hexadecimal number "01", the bits #16 to #23 contains the corresponding value of the SubBytes S-box multiplied by the hexadecimal number "01", and the bits #24 to #31 contains the corresponding value of the SubBytes S-box multiplied by the hexadecimal number "02". Correspondingly, each 32-bit word of the expanded S-Boxes #1 contains sequences of bits #0 to #7, #8 to #15, #16 to #23, and #24 to 31 which sequences respectively contain the corresponding values of the SubBytes S-box multiplied by the hexadecimal number "03", "02", "01", and "01", each 32-bit word of the expanded S-Boxes #2 contains sequences of bits #0 to #7, #8 to #15, #16 to #23, and #24 to 31 which sequences respectively contain the corresponding values of the SubBytes S-box multiplied by the hexadecimal number "01", "03", "02", and "01", and each 32-bit word of the expanded S-Boxes #3 contains sequences of bits #0 to #7, #8 to #15, #16 to #23, and #24 to 31 which sequences respectively contain the corresponding values of the SubBytes S-box multiplied by the hexadecimal number "01", "01", "03", and "02".

The "expanded" S-Boxes #0 to #3 enables SIMD (single instruction multiple data) processing for implementing the SubBytes, ShiftRows, and MixColumns transformations with reduced amount of processing, which only includes four table lookups to the expanded S-Boxes and four additions 1703 in $GF(2^8)$. This allows the Gladman's method to achieve an improved speed.

The aforementioned cipher transformations can be inverted and then implemented in reverse order to achieve description for the AES algorithm.

FIG. 6 is a flowchart of implementing decryption according to the AES algorithm. The decryption begins with an initial AddRoundKey transformation 1802. After the initial AddRoundKey transformation 1802, first to (Nr-1)-th rounds 1803 are implemented, and followed by a final round 1808. The rounds includes InvSubBytes, InvShiftRows, InvMixColumns, and AddRoundKey' transformations 1804, 1805, 1806, and 1807, with exception of the final round 1408, which does not include the MixColumns transformation, where the InvSubBytes, InvShiftRows, InvMixColumns, and AddRoundKey' transformations 1804, 1805, 1806, and 1807 are the inverses of the SubBytes, ShiftRows, MixColumns, and AddRoundKey transformations 1404, 1405, 1406, and 1407, respectively. It should be noted that the AddRoundKey transformation is its inverse itself; however, the prime is attached to distinguish the inverse from the AddRoundKey transformation.

It should be noted that the inverse transformations are not implemented in the reverse order to the cipher transformations; the order of the inverse transformations are optimized to improve efficiency.

First, the InvShiftRows and InvSubBytes transformations 1805 and 1804 are permutated. This permutation is effective for improving the processing speed with the transformation result unchanged. It should be noted that the InvShiftRows and InvSubBytes transformations commute.

Second, the AddRoundKey' and InvMixColumns transformations 1807, and 1806 are permutated. In the reverse order of the cipher transformation, the InvMixColumns transformation 1806 would operate on the result of the AddRoundKey' transformation 1807; however, the order is modified to improve efficiency. It should be noted that the permutation of the AddRoundKey' and InvMixColumns transformations requires that expanded keys going through the InvMixColumns transformations 1807 be used for the AddRoundKey' transformation 1807 in place of the original expanded keys.

As illustrated in FIG. 4 and FIG. 6, rounds for AES-based encryption are almost similar to those for decryption; the difference are the contents of the S-boxes used for the SubBytes and InvSubBytes transformations 1404, and 1804, and the coefficients used for the MixColumns and InvMixColumns transformations 1406 and 1806. In the InvSubBytes transformations 1804, the inverse S-box, which is defined as illustrated in FIG. 14 of FIPS 197, while the InvMixColumns transformations 1806 use the coefficients described in formula (5.10) of FIPS 197.

One of the drawbacks of the conventional encryption and decryption architectures is that it requires increased hardware for improving processing speed. The conventional architectures use a plurality of lookup tables to achieve parallel processing; however, the increase in the lookup tables causes an undesirable increase in hardware. Only a single S-box containing 256 8-bit words requires several thousands of logic gates.

Therefore, there is a need for providing apparatus and method for implementing the AES algorithm with reduced hardware and sufficient throughput.

3. List of Other Prior Art Documents

The following is a description of conventional Galois field processors; a m-bit multiplier module for multiplication over a Galois field GF($2^m$) is disclosed in Japanese Open Laid Patent Application No. Jp-A 2002-23999. Galois field processors for computing the multiplicative inverse in GF($2^8$) are disclosed in Japanese Open Laid Patent Applications No. Jp-A 2000-322280A, and Jp-A-Heisei 11-249921. An error correction circuit including Galois field processors, each of which has a Galois field adder and multiplier, is disclosed in Japanese Open Laid Patent Application No. Jp-A-Showa 63-186338.

SUMMARY OF THE INVENTION

An object of the present invention is to provide a technology for implementing the AES algorithm with reduced hardware and sufficient throughput.

In an aspect of the present invention, an AES encryption processor is composed of a selector unit selecting an element of a state in response to row and column indices, a S-box for obtaining a substitution value with the selected element used as an index, a coefficient table providing first to fourth coefficients in response to the row index, first to fourth Galois field multipliers respectively computing first to fourth products, which are obtained by multiplication of the substitution value with first to fourth coefficients, respectively, and an accumulator which accumulates the first to fourth products to develop first to fourth elements of a designated column of a resultant state.

In an embodiment, the first to fourth coefficients are respectively set to {02}, {01}, {01}, and {03} in response to the row index selecting a first row of the state, to {03}, {02}, {01}, and {01} in response to the row index selecting a second row of the state, to {01}, {03}, {02}, and {01} in response to the row index selecting a third row of the state, and to {01}, {01}, {03}, and {02} in response to the row index selecting a fourth row of the state.

In another aspect of the present invention, an AES encryption processor is provided which is adapted to an AES instruction including first and second operands respectively selecting input and output registers out of a register file, and an immediate operand selecting a row of a state. The AES encryption processor is composed of a selector unit selecting an element of the state in response to the first operand and the immediate operand, the selected element being stored in the input register, a S-box for obtaining a substitution value with the selected element used as an index, a coefficient table providing first to fourth coefficients in response to the immediate operand, first to fourth Galois field multipliers respectively computing first to fourth products, which are obtained by multiplication of the substitution value with first to fourth coefficients, respectively, and a storing unit for storing the first to fourth products into the output register selected by the second operand.

The AES encryption processor preferably includes a processing unit adapted to implement XORing, when the AES encryption processor is further adapted to an XOR instruction; the processing unit implements XORing of values contained in two selected registers of the register file.

In still another aspect of the present invention, an AES decryption processor is composed of a selector unit selecting an element of a state in response to row and column indices, an inverse S-box for obtaining a substitution value with the selected element used as an index, a coefficient table providing first to fourth coefficients in response to the row index, first to fourth Galois field multipliers respectively computing first to fourth products, which are obtained by multiplication of the substitution value with first to fourth coefficients, respectively, and an accumulator which accumulates the first to fourth products to develop first to fourth elements of a designated column of a resultant state.

In still another aspect of a present invention, an AES decryption processor is provided which is adapted to an AES instruction including first and second operands respectively selecting input and output registers out of a register file, and an immediate operand selecting a row of a state. The AES decryption processor is composed of a selector unit selecting an element of the state in response to the first operand and the immediate operand, the selected element being stored in the input register, a S-box for obtaining a substitution value with the selected element used as an index, a coefficient table providing first to fourth coefficients in response to the immediate operand, first to fourth Galois field multipliers respectively computing first to fourth products, which are obtained by multiplication of the substitution value with first to fourth coefficients, respectively, and a storing unit for storing the first to fourth products into the output register selected by the second operand.

In still another aspect of the present invention, an AES processor adapted to both encryption and decryption is composed of a first selector unit selecting an element of a state in response to row and column indices, an inverse affine transformation circuit applying an inverse affine transformation on the selected element, a second selector unit selecting one out of two data bytes consisting of the selected element received from the first selector, and a result of the inverse affine transformation received the inverse affine transformation circuit, wherein the selected element is selected for encryption, while the result of the inverse affine transformation is selected for decryption, an inverse determining unit obtaining a multiplicative inverse of the selected data byte received from the second selector, an affine transformation circuit applying an affine transformation on the obtained multiplicative inverse, a third selector unit selecting one of two data bytes consisting of the multiplicative inverse received from the inverse determining unit, and a result of the affine transformation received from affine transformation circuit, wherein the result of the affine transformation is selected for decryption, while the multiplicative inverse is selected for encryption, a coefficient table providing first to fourth coefficients in response to the row index, first to fourth Galois field multipliers respectively computing first to fourth products, which are obtained by multiplication of the substitution value with first to fourth coefficients, respectively, and an accumulator which accumulates the first to fourth products to develop first to fourth elements of a designated column of a resultant state.

In still another aspect of the present invention, an AES processor is provided which is adapted to an AES instruction including first and second operands respectively selecting input and output registers out of a register file, and an immediate operand selecting a row of a state. The AES processor is composed of a first selector unit selecting an element of the state in response the first operand and the immediate operand, the selected element being stored in the input register, an inverse affine transformation circuit applying an inverse affine transformation on the selected element, a second selector unit selecting one out of two data bytes consisting of the selected element received from the first selector, and a result of the inverse affine transformation received the inverse affine transformation circuit, wherein the selected element is selected for encryption, while the result of the inverse affine transformation is selected for decryption, an inverse determining unit obtaining a multiplicative inverse of the selected data byte received from the second selector, an affine transformation circuit applying an affine transformation on the obtained multiplicative inverse, a third selector unit selecting one of two data bytes consisting of the multiplicative inverse received from the inverse determining unit, and a result of the affine transformation received from affine transformation circuit, wherein the result of the affine transformation is selected for decryption, while the multiplicative inverse is selected for encryption, a coefficient table providing first to fourth coefficients in response to the row index, first to fourth Galois field multipliers respectively computing first to fourth products, which are obtained by multiplication of the substitution value with first to fourth coefficients, respectively, and a storing unit for storing the first to fourth products into the output register selected by the second operand.

In still another aspect of the present invention, an AES processor is provided which is adapted to an AES instruction including first and second operands respectively selecting input and output registers out of a register file, and an immediate operand selecting a row of a state(s). The AES processor is composed of a plurality of AES processor cores respectively associated with a plurality of columns of the state(s), a coefficient table providing first to fourth coefficients in response to the immediate operand. Each of the plurality of AES processor cores includes a first selector unit selecting an element of the state(s) in response the first operand and the immediate operand, the selected element being stored in the input register, an inverse affine transformation circuit applying an inverse affine transformation on the selected element, a second selector unit selecting one out of two data bytes consisting of the selected element received from the first selector, and a result of the inverse affine transformation received the inverse affine transformation circuit, wherein the selected element is selected for encryption, while the result of the inverse affine transformation is selected for decryption, an inverse determining unit obtaining a multiplicative inverse of the selected data byte received from the second selector, an affine transformation circuit applying an affine transformation on the obtained multiplicative inverse, a third selector unit selecting one of two data bytes consisting of the multiplicative inverse received from the inverse determining unit, and a result of the affine transformation received from affine transformation circuit, wherein the result of the affine transformation is selected for decryption, while the multiplicative inverse is selected for encryption, first to fourth Galois field multipliers respectively computing first to fourth products, which are obtained by multiplication of the substitution value with first to fourth coefficients, respectively, and a storing unit for storing the first to fourth products into the output register selected by the second operand.

BRIEF DESCRIPTION OF THE DRAWINGS

FIG. 5 is a signal flow diagram illustrating the Gladman's method of collectively implementing the SubBytes, ShiftRows, and MixColumns transformations;

FIG. 8 is a table illustrating values contained in a coefficient table used for encryption;

FIG. 12 is a table illustrating the result of an AES_SSM instruction, which depends on the immediate operand thereof;

FIG. 13 is an instruction code using AES_SSM instructions for achieving the SubBytes, ShiftRows, and MixColumns transformations;

FIG. 14 is a table illustrating values contained in a coefficient table used for decryption;

FIG. 15 is a table illustrating the result of an inverse AES_SSM instruction, which depends on the immediate operand thereof;

FIG. 21 is a table illustrating the values contained in the S-box used for the SubBytes transformation;

FIG. 22 is a table illustrating the values contained in the inverse S-box used for the InvSubBytes transformation; and FIG. 23 is a table illustrating the values contained in an inverse table used for taking a multiplicative inverse in $GF(2^8)$.

DESCRIPTION OF THE PREFERRED EMBODIMENTS

Figure 1:
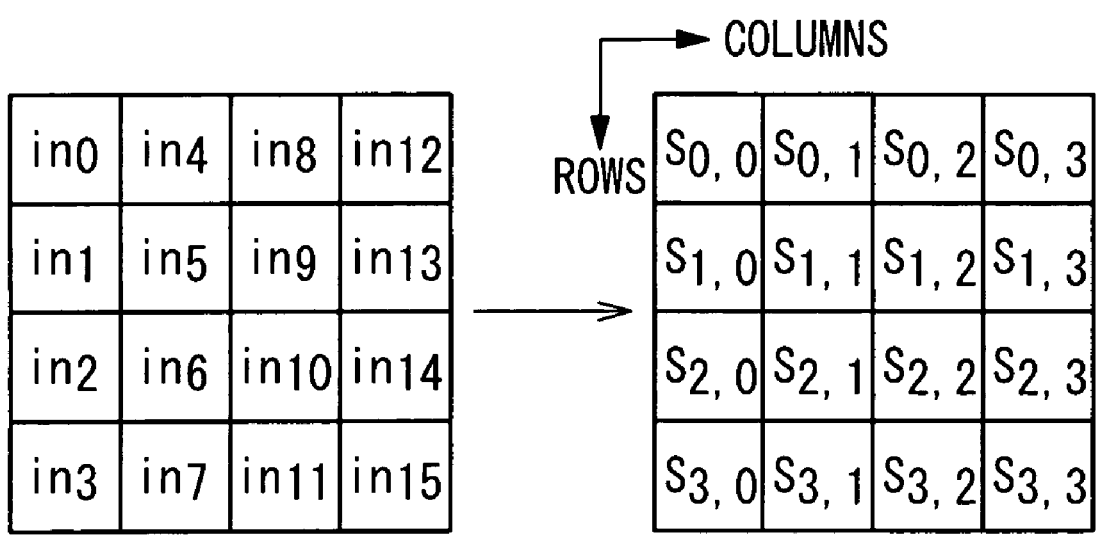
FIG. 1 illustrates the data structure of the state, which is used for implementing the AES algorithm.
Figure 2:
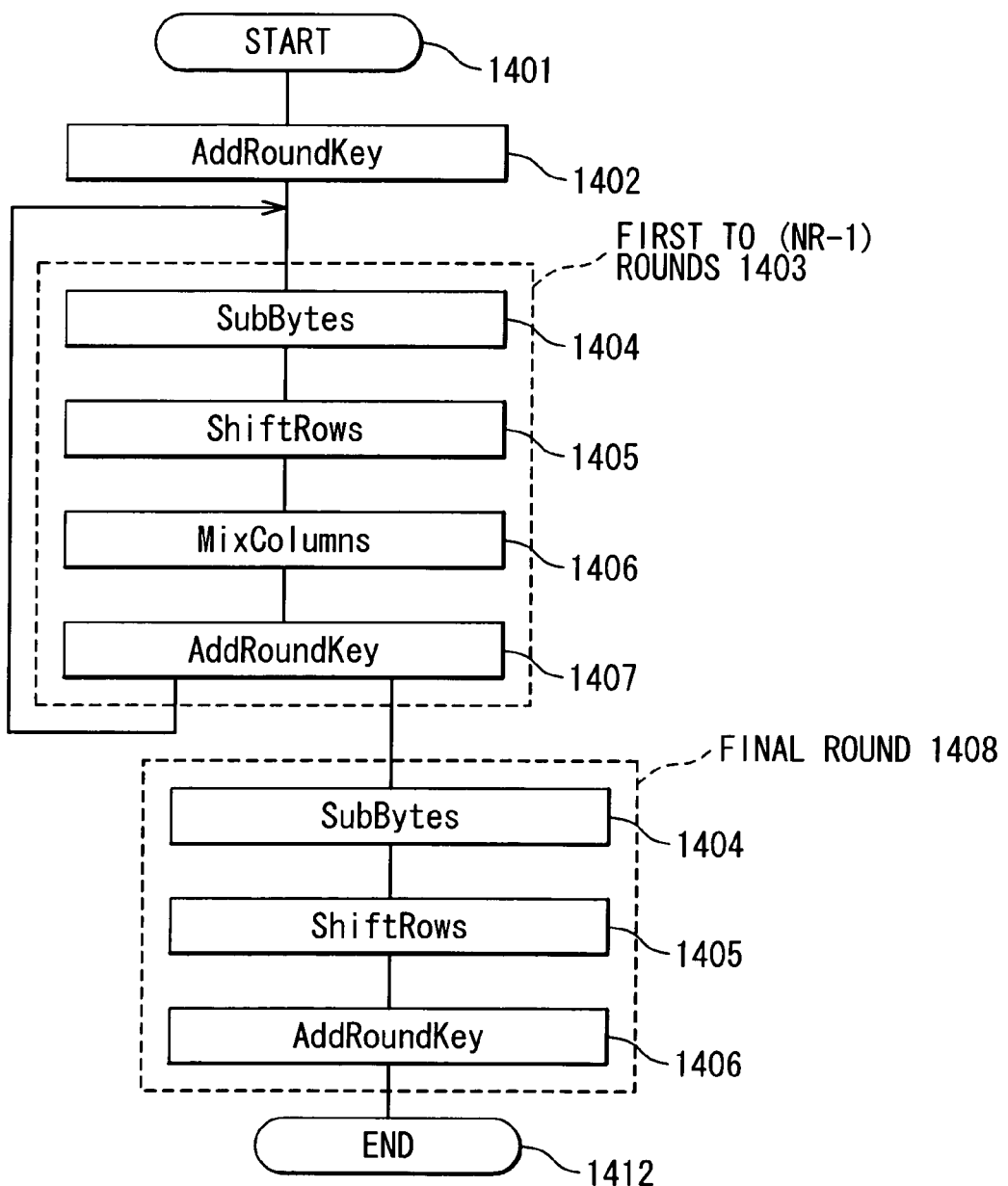
FIG. 2 is a flowchart illustrating a typical procedure of implementing encryption using the AES algorithm.
Figure 3:
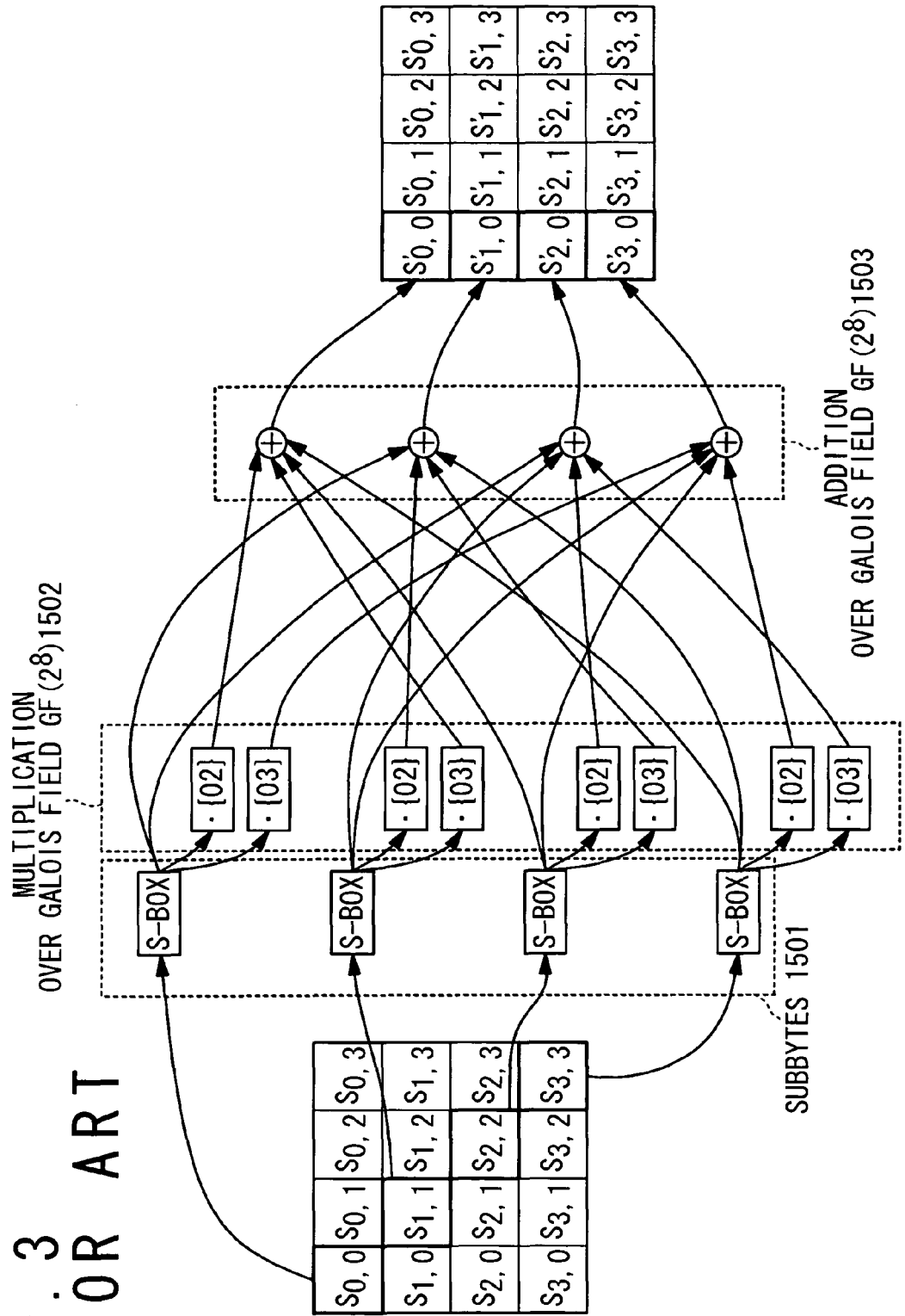
FIG. 3 is a signal flow diagram illustrating a typical procedure of collectively implementing the SubBytes, ShiftRows, and MixColumns transformations.
Figure 4:
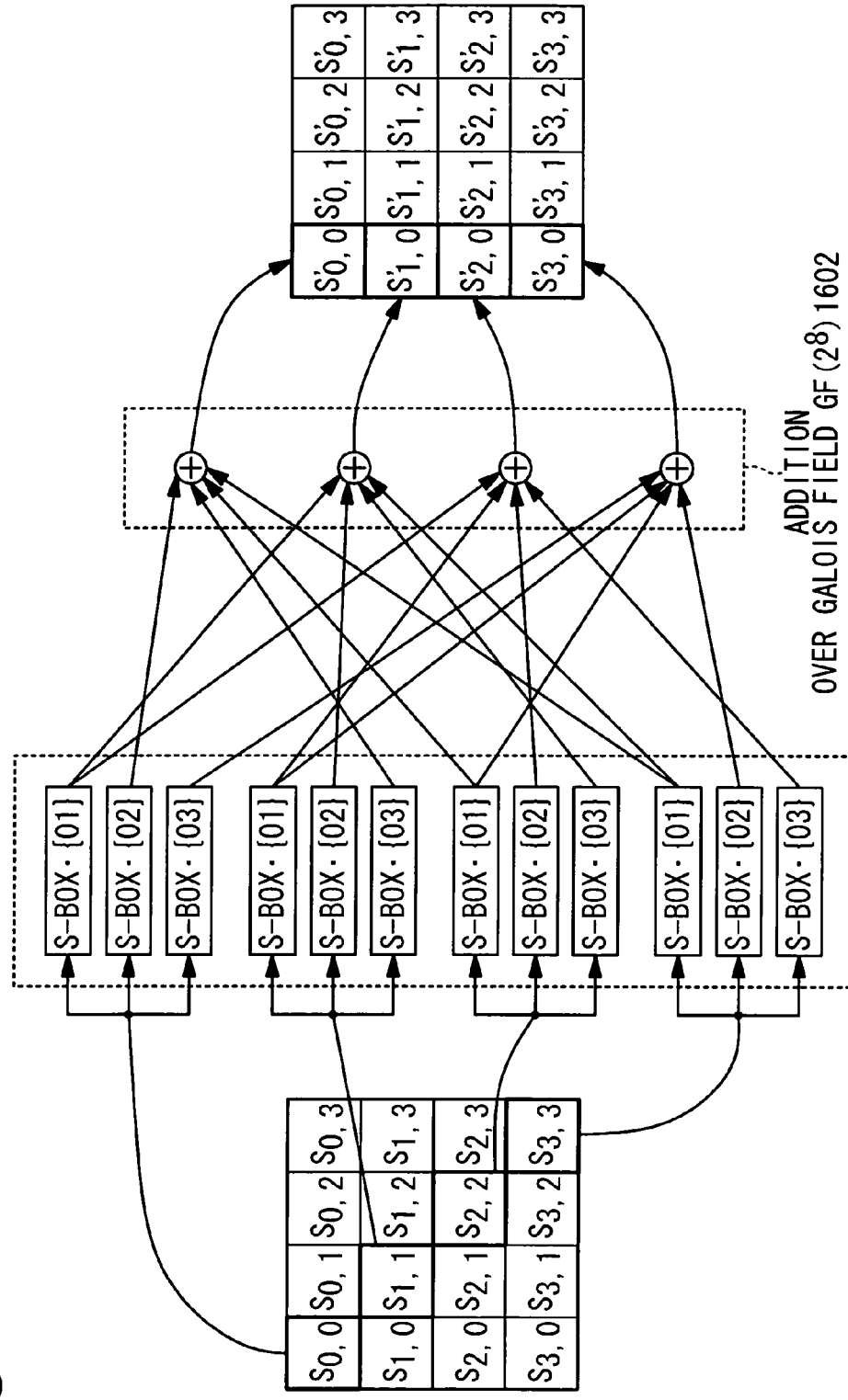
FIG. 4 is a signal flow diagram illustrating the McLoone's method of collectively implementing the SubBytes, ShiftRows, and MixColumns transformations.
Figure 6:
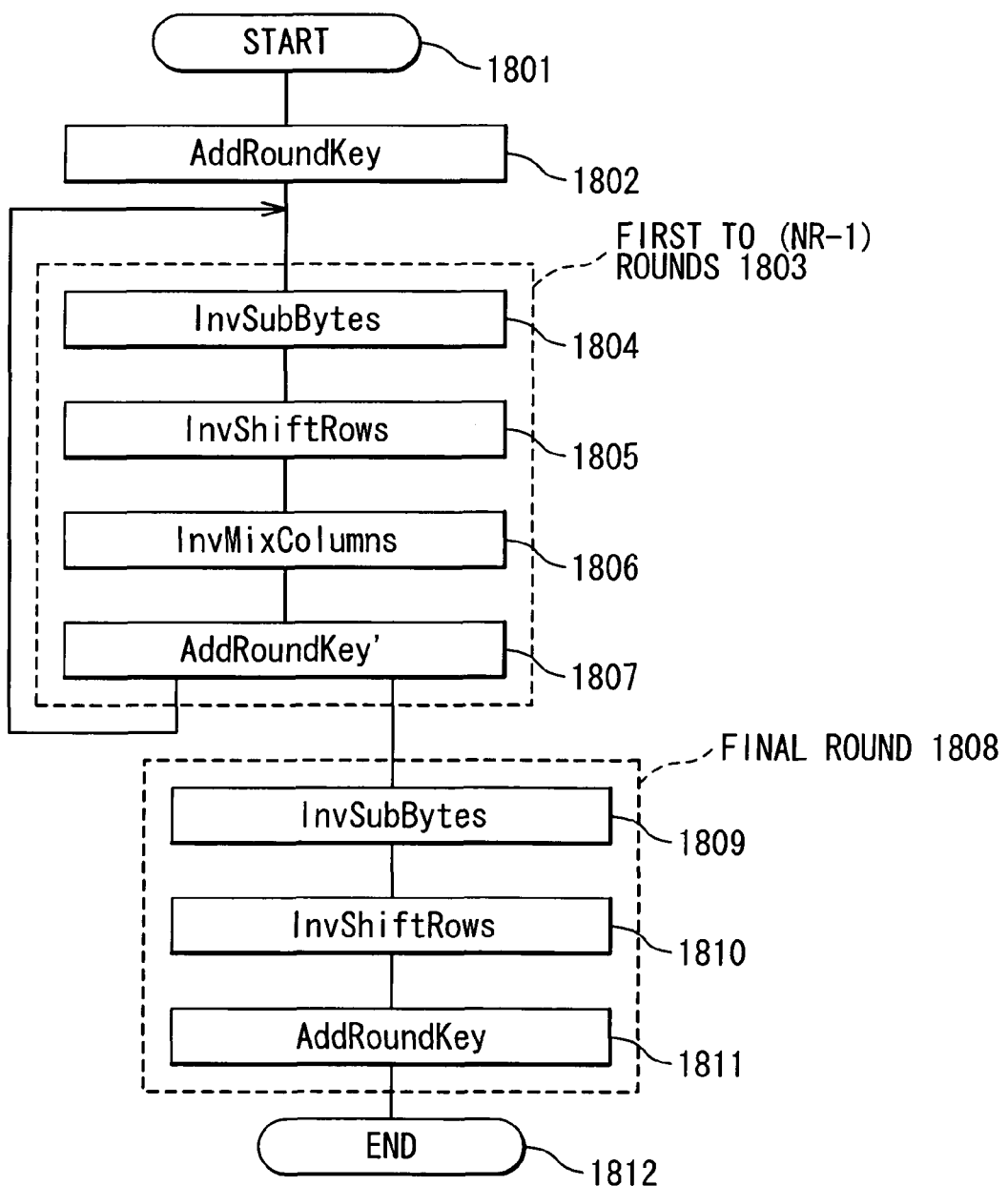
FIG. 6 is a flowchart illustrating a typical procedure of implementing decryption using the AES algorithm.

Preferred embodiments of the present invention are described below in detail with reference to the attached drawings. In the drawings, like or similar elements are designated by identical reference numerals throughout the several views thereof.

1. Operations Over Galois Field $GF(2^8)$

As described in FIPS 197, the AES algorithm involves various operations over Galois field $GF(2^8)$. The following is a brief description of the Galois field operations.

1-1) Element in $GF(2^8)$

The Galois field $GF(p^m)$ can be generated as the set of polynomials with coefficients in $GF(2)$ modulo an irreducible polynomial of degree m. A polynomial $b(x)$ that is an element in $GF(2^8)$ is described as follows:

$$b(x)=b_7x^7+b_6x^6+b_5x^5+b_4x^4+b_3x^3+b_2x^2+b_1x^1+b_0, \quad (1)$$

where $b_i$ is the selected value out of 1 and 0, which are the elements in $GF(2)$, for $0 \leq i \leq 7$. In binary notation, this polynomial is described as $\{b_7b_6b_5b_4b_3b_2b_1b_0\}$. Elements in $GF(2^8)$ may be expressed in hexadecimal notation, in which binary numbers are replaced with hexadecimal numbers in the brackets.

1-2) Addition in GF($2^8$)

Figure 18:
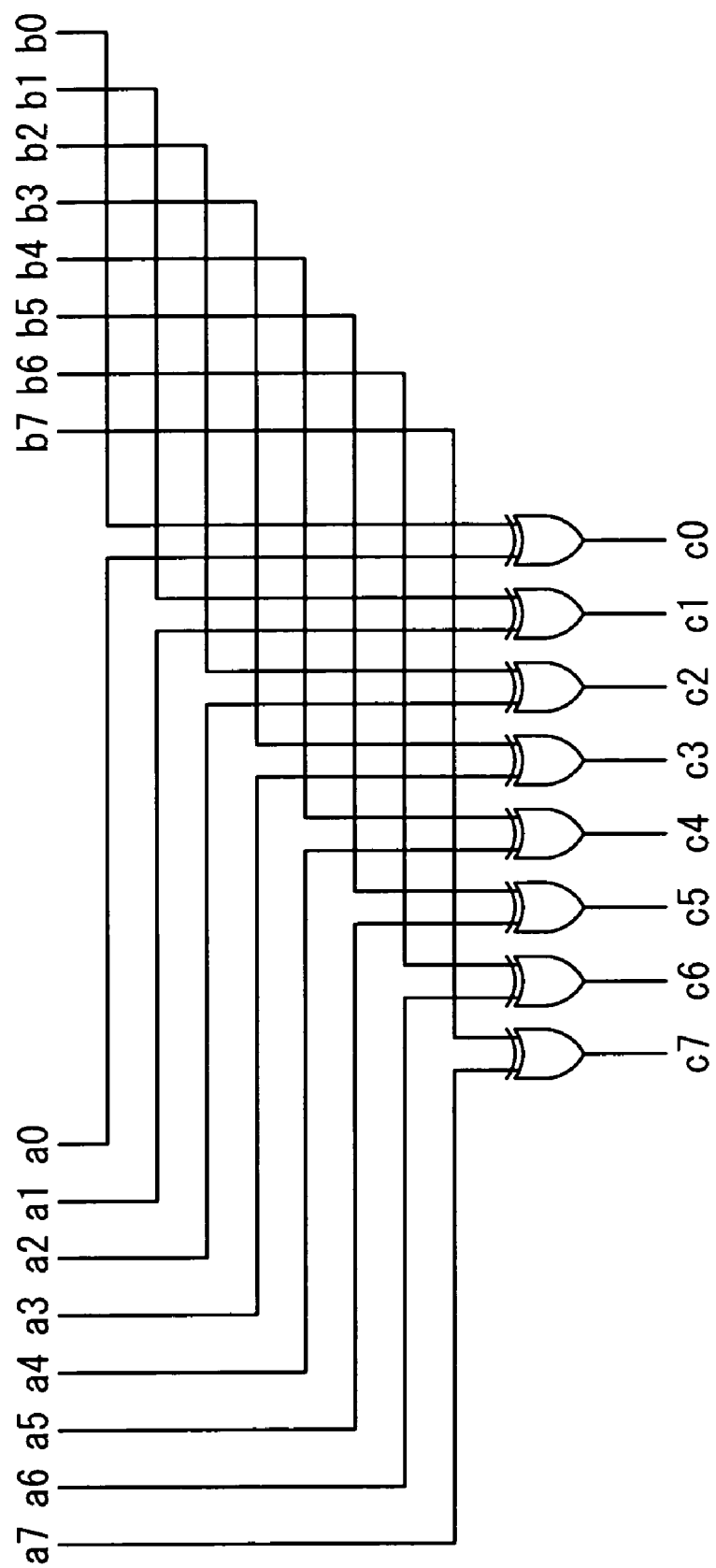
FIG. 18 is a circuit diagram of a typical adder for achieving the addition in $GF(2^8)$.

The addition of two elements in GF($2^8$) is achieved by XORing the coefficients for the corresponding powers in the polynomials (denoted by ⊕). For two bytes $\{a_7a_6a_5a_4a_3a_2a_1a_0\}$ and $\{b_7b_6b_5b_4b_3b_2b_1b_0\}$, the sum is $\{c_7c_6c_5c_4c_3c_2c_1c_0\}$, where each $c_i=a_i \oplus b_i$. As shown in FIG. 18, a typical adder for achieving addition in GF($2^8$) includes eight XOR gates.

1-3) Multiplication in GF($2^8$)

The multiplication in GF($2^8$) corresponds with the multiplication of polynomials modulo an irreducible polynomial of degree 8. Although there are a plurality of irreducible polynomials in GF($2^8$), the AES algorithm adopts the following polynomial for defining the multiplication in GF($2^8$);

$$m(x)=x^8+x^4+x^3+x+1. \qquad (2)$$

The multiplication in GF($2^8$) involves the multiplication with the polynomial x, that is, a hexadecimal value $\{02\}$, in GF($2^8$), which is achieved as described below. Multiplying the binary polynomial defined in equation (1) with the polynomial x results in $$b_7x^8+b_6x^7+b_5x^6+b_4x^5+b_3x^4+b_2x^3+b_1x^2+b_0x. \qquad (3)$$

This operation is equivalent to a left shift by 1 bit in the binary notation.

Figure 19:
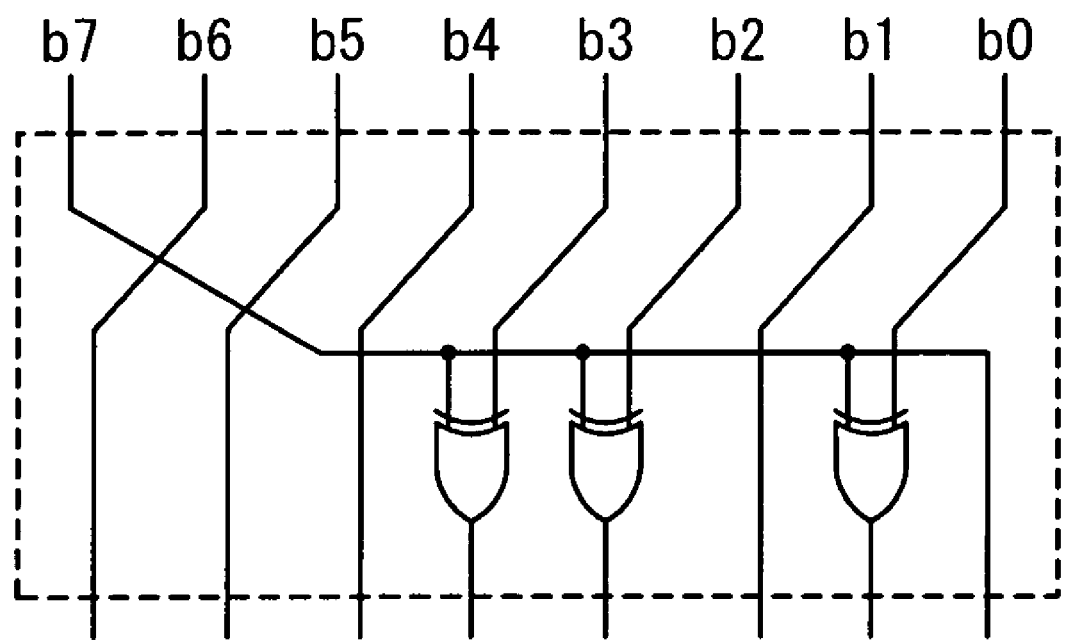
FIG. 19 is a circuit diagram of a typical multiplier for achieving the multiplication of an element with a hexadecimal value {02} in $GF(2^8)$.

The result of x·b(x) is obtained by reducing the above result modulo m(x) defined in equation (2). If $b_7=0$, the result is already in reduced form. If $b_7=1$, the reduction is accomplished by subtracting the polynomial m(x), that is, XORing with $\{00011011\}$ (=$\{1b\}$) after the left shift. FIG. 19 shows a typical multiplier computing the product of an element $\{b_7b_6b_5b_4b_3b_2b_1b_0\}$ with $\{00000010\}$ (=$\{02\}$).

Figure 20:
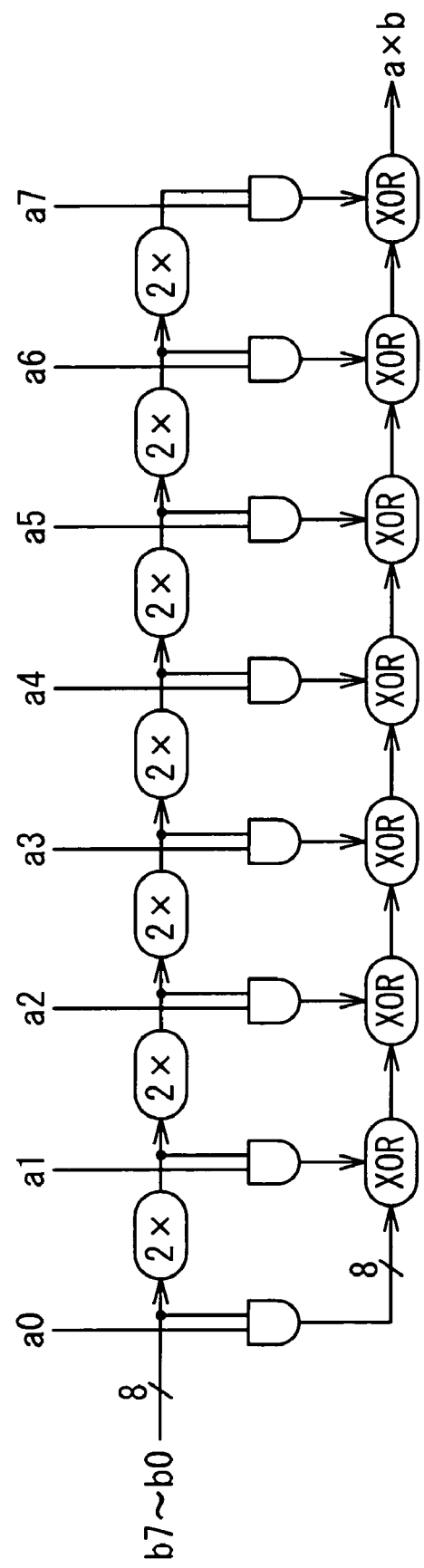
FIG. 20 is a circuit diagram of a typical multiplier for achieving the multiplication in $GF(2^8)$.

Arbitrary multiplication in GF($2^8$) can be expressed with combination of multiplication by power(s) of x, (i.e., $\{00000010\}$ or $\{02\}$) and the addition (i.e., XORing). FIG. 20 shows a typical Galois field multiplier computing the product of two bytes $\{a_7a_6a_5a_4a_3a_2a_1a_0\}$ and $\{b_7b_6b_5b_4b_3b_2b_1b_0\}$ in GF($2^8$). Symbols "2x" represent the multipliers achieving multiplication by $\{02\}$ illustrated in FIG. 19, while symbols "XOR" represent the adders illustrated in FIG. 18. As described later, encryption using the AES algorithm requires Galois field multipliers for multiplications by $\{02\}$, and $\{03\}$, while decryption using the AES algorithm requires multipliers for multiplications by $\{09\}$, $\{0b\}$, $\{0d\}$, and $\{0e\}$.

2. First Embodiment

Figure 7:
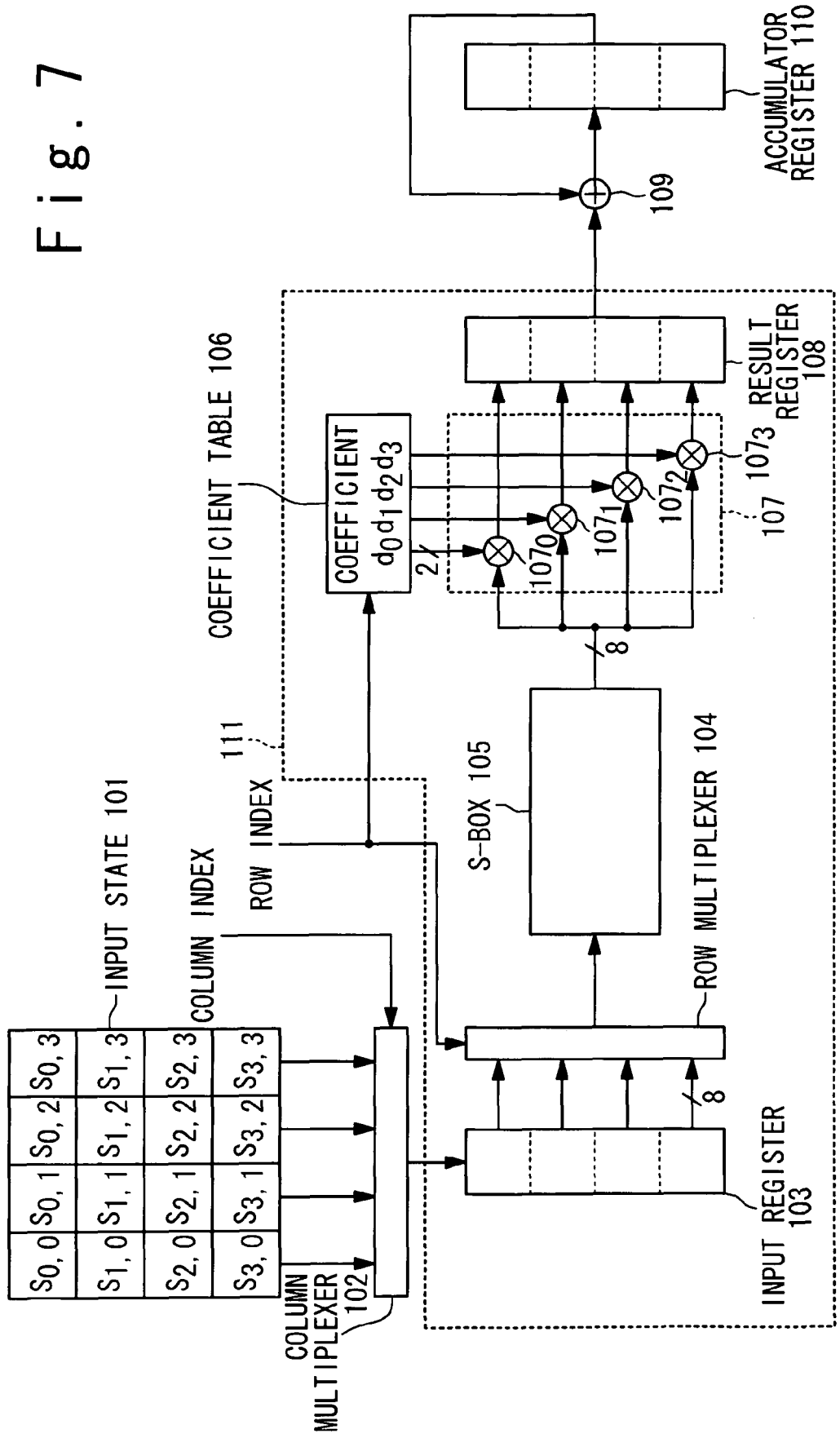
FIG. 7 is a block diagram illustrating a structure of an AES encryption processor in a first embodiment.

In a first embodiment, as shown in FIG. 7, an AES encryption processor is provided with a column multiplexer 102, an input register 103, a row multiplexer 104, a S-box 105, a coefficient table 106, first to fourth Galois field multipliers $107_0$ to $107_3$ (which are collectively denoted by numeral 107), an result register 108, a Galois field adder 109, and an accumulator register 110.

The column multiplexer 102 receives an input state 101, which is an array of 16 8-bit elements arranged in four rows and four columns. As described above, the elements of the input state 101 are denoted by $S_{i,j}$ for $0 \leq i, j \leq 3$. The input state 101 may be stored in a register accessible from software in units of columns.

The column multiplexer 102, the input register 103, and the row multiplexer 104 are responsive to column and row indices received from a controller (not shown) for selecting a requested element from the input state 101. The column multiplexer 102 selects one column, which includes four elements, from the input state 101, and provides the four elements within the selected column for the input register 103. The input register stores therein the received four elements. The row multiplexer 104 selects the requested element arranged in the requested row, and provides the selected element for the S-box 105.

The S-box 105 is used to develop an 8-bit substitution value, which is the result of the SubBytes transformation, with the selected element used as the index. The S-box 105 is typically composed of an 8-bit 256 word ROM, RAM or a combinational circuit. As illustrated in FIG. 21, the values contained in the S-box 105 are identical to those disclosed in FIG. 7 of FIPS 197. The substitution value, obtained using the S-box 105, is provided for the first to fourth Galois field multipliers $107_0$ to $107_3$.

The coefficient table 106 provides 2-bit coefficients $d_0$ to $d_3$ for the multipliers $107_0$ to $107_3$ in response to the row index, which is used for selecting the requested element.

Referring to FIG. 8, the values contained in the coefficient table 106 are the elements of the transposed matrix of the coefficient matrix described in equation (5.6) of FIPS 197. For the row index "0", which selects the first row of the input state 101, the coefficient table 106 sets the coefficients $d_3$, $d_2$, $d_1$, and $d_0$ to the hexadecimal numbers $\{02\}$, $\{01\}$, $\{01\}$, and $\{03\}$, respectively. For the row index "1", which selects the second row of the input state 101, the coefficient table 106 sets the coefficients $d_3$, $d_2$, $d_1$, and $d_0$ to the hexadecimal numbers $\{03\}$, $\{02\}$, $\{01\}$, and $\{01\}$, respectively. For the row index "2", which selects the third row of the input state 101, the coefficient table 106 sets the coefficients $d_3$, $d_2$, $d_1$, and $d_0$ to the hexadecimal numbers $\{01\}$, $\{03\}$, $\{02\}$, and $\{01\}$, respectively. Finally, for the row index "3", which selects the fourth row of the input state 101, the coefficient table 106 sets the coefficients $d_3$, $d_2$, $d_1$, and $d_0$ to the hexadecimal numbers $\{01\}$, $\{01\}$, $\{03\}$, and $\{02\}$, respectively.

Referring back to FIG. 7, the Galois field multipliers $107_0$ to $107_3$ compute in GF($2^8$) the products of the 8-bit substitution value received from the S-box 105 with the coefficients $d_0$ to $d_3$, respectively. The Galois field multipliers $107_0$ to $107_3$ may be each composed of the multiplier illustrated in FIG. 20, with the 8-bit substitution value inputted as the bits $b_7$ to $b_0$, and with the coefficient inputted as the bits $a_1$ and $a_0$ from the coefficient table 106. The circuit components associated with $a_2$ to $a_7$ may be omitted.

The result register 108 contains first to fourth bytes associated with the first to fourth rows of the output state, respectively. The products received from the multipliers $107_0$ to $107_3$ are stored as the first to fourth data bytes in the result register 108, respectively. The output of the result register 108 is connected to the Galois field adder 109.

The Galois field adder 109 and the accumulation register 110 are used to accumulate the products obtained by the Galois field multipliers $107_0$ to $107_3$ for the first to fourth rows of the output state. The Galois field adder 109 computes the sums of the corresponding bytes received from the result register 108 and the accumulator register 110. The accumulation register 110 latches the computed sums received from the Galois field adder 109. After the SubBytes, ShiftRows, and MixColumns transformations for a desired column are completed, the four elements of the desired column of the output state are developed in the accumulation register 110.

It should be noted that the input register 103 and the result register 108 are provided for pipeline processing. Therefore, the input register 103 and the result register 108 should not be understood as being essential for the AES encryption processor.

Figure 9:
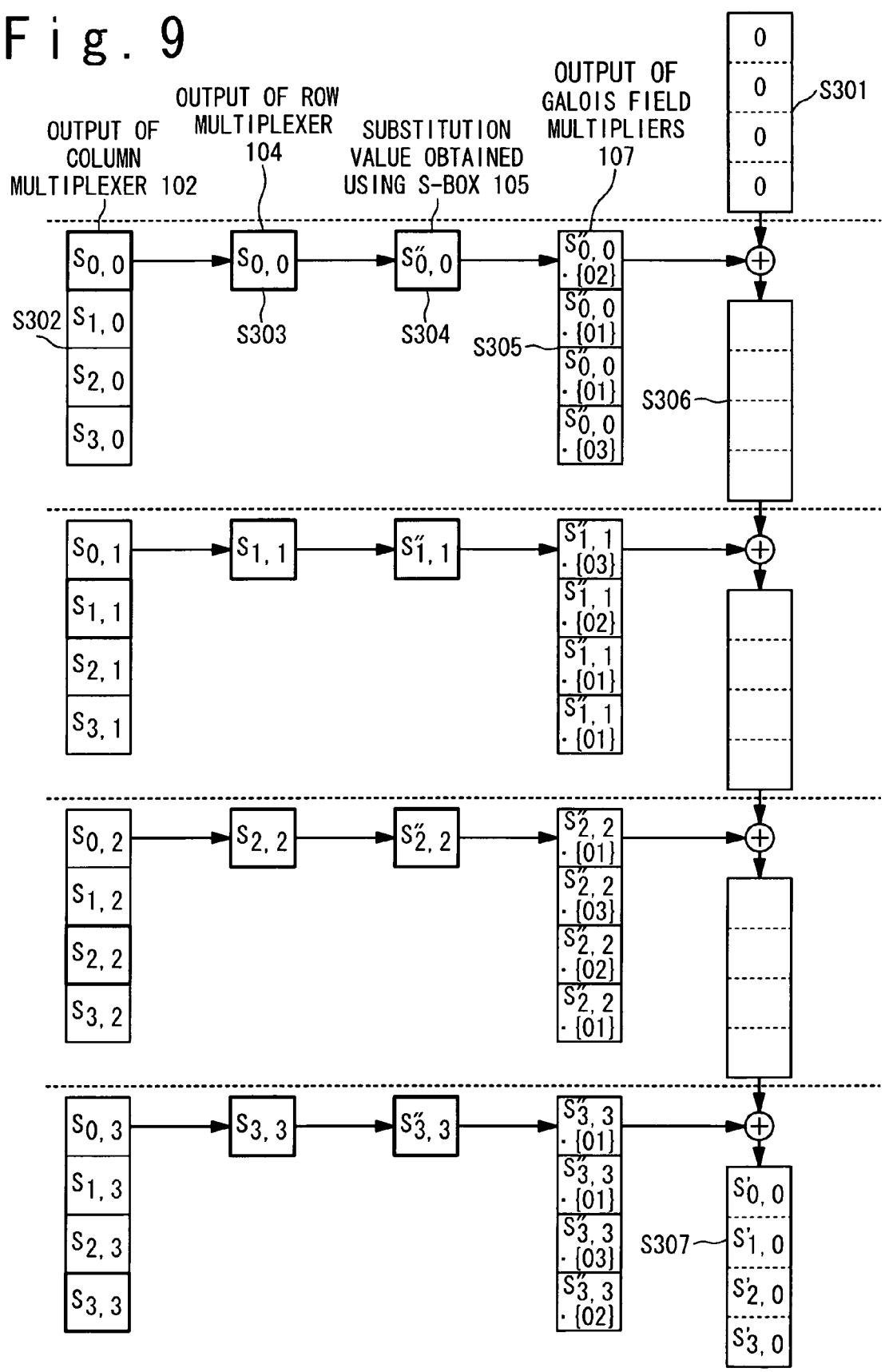
FIG. 9 is a diagram illustrating the operation implemented by the AES encryption processor in the first embodiment.

FIG. 9 illustrates the procedure implemented by the AES encryption processor in this embodiment for obtaining the first column of the output state, that is, the resultant state obtained through the SubBytes, ShiftRows, and MixColumns transformations. The (i, j) element of the output state is referred to as $S'_{i,j}$, hereinafter.

The procedure begins with resetting the accumulator register 110 at Step S301. Resetting the accumulator register 110 is followed by implementing transformations for the (0, 0) element $S_{0,0}$ of the input state 101. In response to the column index being set to "0", the column multiplexer 102 selects the first column of the input state 101 at Step S302. Correspondingly, the row multiplexer 104 selects the first row of the input state 101 at Step S303. This results in that the row multiplexer 104 outputs the (0, 0) element $S_{0,0}$ of the input state 101.

The substitution transformation using the S-box 105 is then implemented to develop the substitution value $S''_{0,0}$ with the element $S_{0,0}$ used as the index at Step S304.

The coefficient table 106 provides four coefficients $d_0$ to $d_3$ in response to the row index being set to "0". As described below, the coefficients $d_0$, $d_1$, $d_2$, and $d_3$ are respectively used for obtaining the $S'_{0,j}$, $S'_{1,j}$, $S'_{2,j}$, and $S'_{3,j}$ elements of the output state.

The multipliers $107_0$ to $107_3$ then computes the products of the substitution value $S''_{0,0}$ with the four coefficients $d_0$ to $d_3$ received from the coefficient table 106, respectively, the products being denoted by $'S''_{0,0} \cdot \{02\}'$, $'S''_{0,0} \cdot \{01\}'$, $'S''_{0,0} \cdot \{01\}'$, and $'S''_{0,0} \cdot \{03\}'$.

The multipliers $107_0$ to $107_3$ provide the products as the four output bytes for the Galois field adder 109 at Step S305. The adder 109 computes the sums of the corresponding bytes received from the multipliers $107_0$ to $107_3$ and the accumulator register 110. The four bytes stored in the accumulator register 110 are respectively updated to the sums of the corresponding bytes at Step S306.

Correspondingly, the elements $S_{1,1}$, $S_{2,2}$, and $S_{3,3}$ are then processed successively. The elements $S_{1,1}$, $S_{2,2}$, and $S_{3,3}$ are serially selected by the column and row multiplexers 102 and 104, and the substitution values $S''_{1,1}$, $S''_{2,2}$, and $S''_{3,3}$ are successively obtained using the S-box 105 for the elements $S_{1,1}$, $S_{2,2}$, and $S_{3,3}$. The substitution values $S''_{1,1}$, $S_{2,2}$, and $S''_{3,3}$ are each multiplied with the coefficients $d_0$ to $d_3$. The sums of the corresponding bytes received from the multipliers $107_0$ to $107_3$ and the accumulator register 110 are then successively computed by the Galois field adder 109 for each of the substitution values $S''_{1,1}$, $S''_{2,2}$, and $S''_{3,3}$ to update the stored bytes within the accumulator register 110. The completion of the addition by the Galois field adder 109 for the element $S_{3,3}$ results in that the four elements $S'_{0,0}$, $S'_{1,0}$, $S'_{2,0}$ and $S'_{3,0}$, of the first column of the output state are developed in the accumulator register 110. This process is equivalent to implementing the SubBytes, ShiftRows, and MixColumns transformations for obtaining the first column of the output state.

The same goes for the remainder columns of the output state. The second column of the output state is obtained from the elements $S_{0,1}$, $S_{1,2}$, $S_{2,3}$, and $S_{3,0}$, the third column from the elements $S_{0,2}$, $S_{1,3}$, $S_{2,0}$, and $S_{3,1}$, and the fourth column is obtained from the elements $S_{0,3}$, $S_{1,0}$, $S_{2,1}$, and $S_{3,2}$.

The architecture in this embodiment effectively reduces necessary hardware while achieving the parallel processing. The coefficient table 106, the multipliers $107_0$ to $107_4$, and the adder 109 eliminate the need for preparing a plurality of S-boxes (or expanded S-boxes) for implementing parallel processing in connection with a single column of the output state.

For instance, the architecture in this architecture typically requires about one sixteenth of hardware compared to that of the aforementioned Gladman's method. The Gladman's method requires four lookup tables; each contains 256 32-bit words, that is, a 32 k-bit memory. In contrast, the architecture in this architecture requires the single S-box 105 containing 256 8-bit words, that is, a 2 k-bit memory. Because the hardware sizes of the Galois field multipliers 107 are negligible, the required hardware can be considered as being proportional to the hardware size of S-boxes (or expanded S-box). This deduces that the architecture in this architecture effectively reduces hardware compared to the Gladman's method.

3. Second Embodiment

Figure 10:
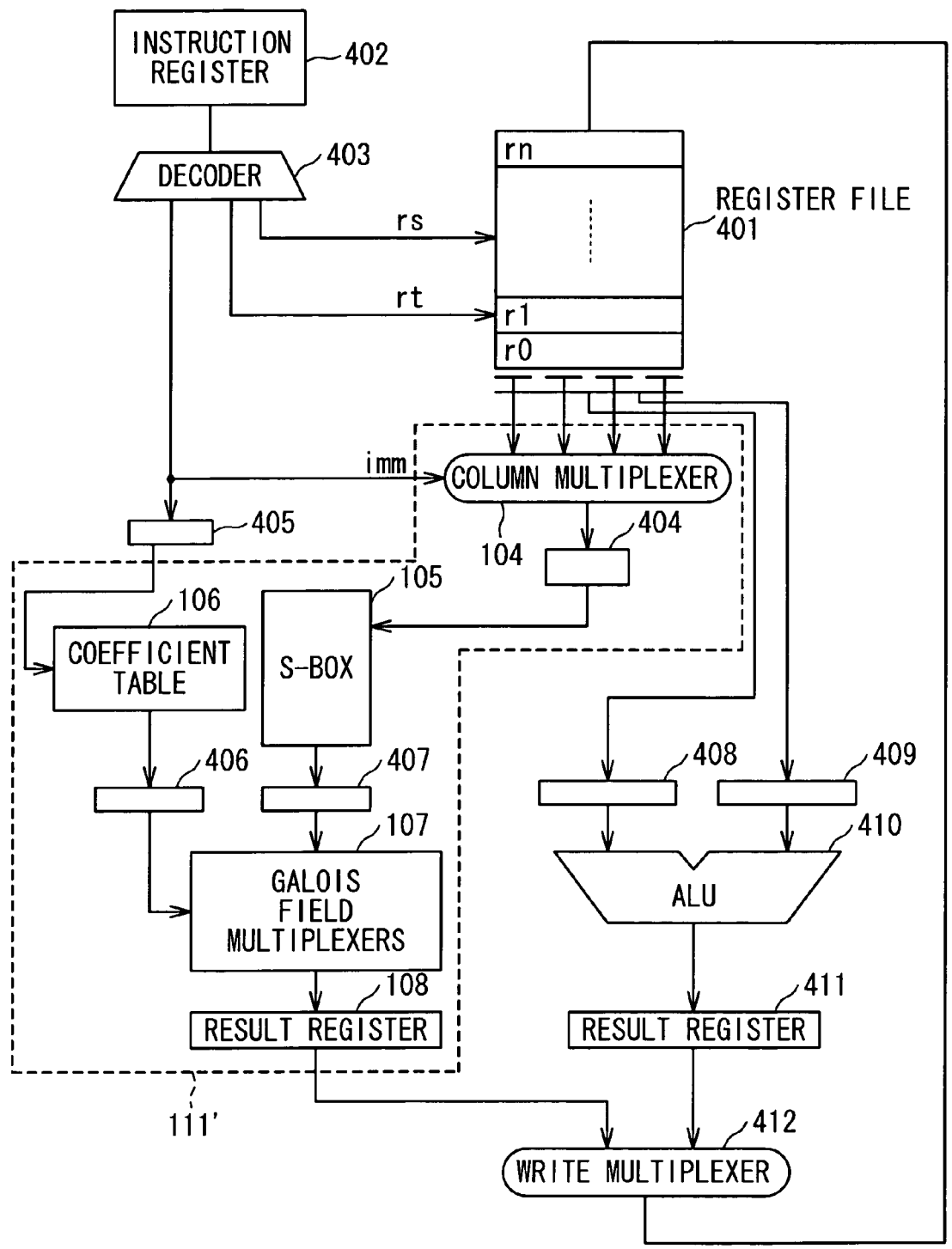
FIG. 10 is a block diagram illustrating an AES encryption processor in a second embodiment.

In a second embodiment, as illustrated in FIG. 10, an AES encryption processor is provided which is adapted to an instruction set including an AES-dedicated instruction denoted by "AES_SSM", which requests the SubBytes, ShiftRows, and MixColumns transformations. The following is the mnemonic code for the AES_SSM instruction:

AES_SSM rs, rt, imm, where the operand rs indicates an input register, the operand rt indicates an output register, and the operand imm is an immediate operand indicating a row index used for selecting the row of the desired element.

Figure 11A:
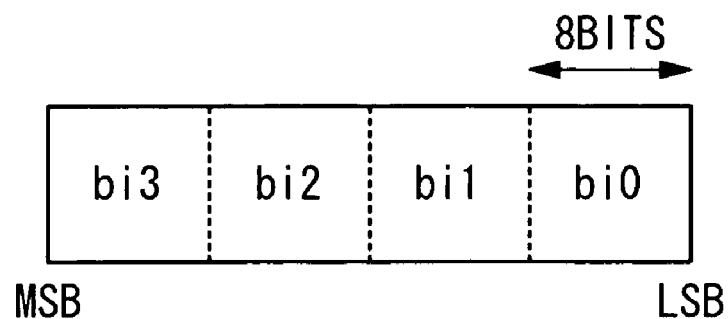
FIGS. 11A and 11B illustrates data structure of input and output registers, respectively.
Figure 11B:
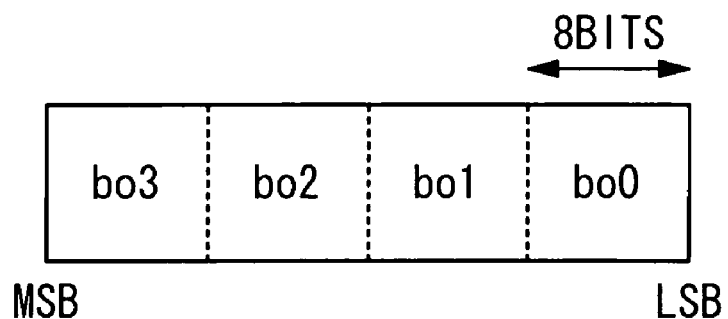

FIGS. 11A and 11B illustrate the data to be stored in the input and output registers rs and rt. The registers rs and rt are adapted to contain four-byte data, which allows the registers rs and rt to store therein four elements of a desired column of a state. The four bytes stored in the input register rs are denoted by symbols bi0 to bi3, while the four bytes stored in the output register rt are denoted by symbols bo0 to bo3. The bytes bi0 to bi3 are respectively associated with the first to fourth rows of the input state. Correspondingly, the bytes bo0 to bo3 are respectively associated with the first to fourth rows of the output state.

Referring back to FIG. 10, the AES encryption processor includes a register file 401 including general-purpose registers r1 to rn, an instructions buffer 402, a decoder 403, auxiliary registers 403 to 409, an arithmetic logic unit (ALU) 410, a result register 411, a write multiplexer 412, a row multiplexer 104, a S-box 105, a coefficient table 106, Galois field multipliers $107_0$ to $107_3$, and a result register 108, where the Galois field multipliers $107_0$ to $107_3$ are collectively denoted by numeral 107. In response to the operands of the AES_SSM instruction, one of the general-purpose registers is selected as the input register rs, another is selected as the output register rt.

Circuitry 111' surrounded with a broken line in FIG. 10 functionally corresponds with the circuitry 111 in FIG. 7. Therefore, detailed description of the circuitry 111' is not given.

The auxiliary registers 408 and 409 receive four-byte data from selected two of the general-purpose registers within the register file 401.

The ALU 410 is used for XORing the four-byte data stored in the auxiliary registers 408 and 409. The result of the XORing is transferred to the result register 411.

The write multiplexer 412 selects one of the four-byte data received from the result registers 108 and 411. The selected data is stored in one of the general-purpose registers within the register file 401, which is selected as the output register rt.

It should be noted that the auxiliary registers 404 to 409 and the result registers 108 and 411 are provided for pipeline processing. Therefore, these registers should not be understood as being essential for the AES encryption processor.

FIG. 12 illustrates the result of an AES_SSM instruction developed in the output register rt, which is selected by the operand rt. An input state is stored into selected four registers within the register file 401; each of the four registers stores therein four elements of the corresponding column of the input state. The operand rs selects one of the registers of the register file 401, that is, one of the columns of the input state. The operand imm is used as the row index that selects one of the rows of the input state. In other words, the operands rs and imm are used to select one of the 16 elements of the input state.

When the operand imm of the AES_SSM instruction is set to a value "00", which selects the first row of the input state, the issue of the AES_SSM instruction results in that the bytes bo0 to bo3 are set to S-box(bi0)·{02}, S-box(bi0)·{01}, S-box(bi0)·{01}, and S-box(bi0)·{03}, respectively, where S-box(bik) represents the substitution value obtained using the S-box 105 with the byte bik within the input register rs used as the index. Correspondingly, the result of the AES_SSM instruction is obtained as illustrated in FIG. 12 for other rows.

In detail, the result of the AES_SSM instruction is obtained as described below. Referring back to FIG. 10, when an AES_SSM instruction is issued, the AES_SSM instruction is latched by the instruction buffer 402 and decoded by the decoder 403. The decoder 403 obtains the operands rs, rt, and imm from the instruction. The obtained operand imm is transferred to the auxiliary register 405.

In response to the operand rs, which selects one of the columns of the input state, one of the registers within the register file 401 is selected as the input register rs, and the four bytes stored in the input register rs is then transferred to the row multiplexer 104. It should be noted that the four bytes corresponds with the four elements of the selected column of the input state.

The row multiplexer 104 selects one of the transferred four bytes, and the selected byte is stored in the auxiliary register 404. It should be noted that the selected byte corresponds with the selected element.

In response to the selected byte received from the auxiliary register, the substitution value is obtained using the S-box 105 with the selected byte used as the index. The obtained substitution value is then latched by the auxiliary register 407.

The coefficient table 106 is responsive to the operand imm received from the auxiliary register 405, which is used as the row index, to provide a set of coefficients $d_0$ to $d_3$ for the auxiliary register 406.

The Galois field multipliers $107_0$ to $107_3$ respectively receive the coefficients $d_0$ to $d_3$ from the auxiliary register 406, and compute the produces of the selected byte (or element) with the corresponding coefficients. The computed products constitute resultant four-byte data, and the four-byte data is stored in the result register 408. The four-byte data stored in the result register 408 is selected by the write multiplexer 412 and transferred to the output register rt, which is selected from among the registers within the register file 401 by the operand rt received from the decoder 403.

The use of the AES_SSM instruction effectively facilitates the SubBytes, ShiftRows, and MixColumns transformations during encryption. FIG. 13 illustrates an exemplary sequence of instructions for performing the SubBytes, ShiftRows, and MixColumns transformations for obtaining the first column of the output state.

Performing the SubBytes, ShiftRows, and MixColumns transformations begins with initially storing the input state into selected four registers within the register file 401. In this embodiment, the elements $S_{3,3}$, $S_{2,3}$, $S_{1,3}$, and $S_{0,3}$ of the input state are stored in the register r3, and the elements $S_{3,2}$, $S_{2,2}$, and $S_{0,2}$ are stored in the register r2. Correspondingly, the elements $S_{3,1}$, $S_{2,1}$, $S_{1,1}$, and $S_{0,1}$ are stored in the register r1, and the elements $S_{3,0}$, $S_{2,0}$, $S_{1,0}$, and $S_{0,0}$ are stored in the register r0. It should be noted that the elements $S_{k,1}$ are stored as the bytes bik in the registers r0 to r3.

The SubBytes, ShiftRows, and MixColumns transformations are achieved by seven instructions: four AES_SSM instructions, and three XOR instructions, where the XOR instruction designates an instruction attached with first to three operands which performs XORing the values stored in the registers indicated by the first and second operands thereof in $GF(2^8)$, and storing the result in the register indicated by the third operand.

The XOR instruction is performed as described in the following. As is the case of the AES_SSM instructions, upon being issued, the XOR instruction is latched by the instruction buffer 402, and decoded by the decoder 403. In response to the operands of the XOR instruction, two four-byte data are obtained from selected two registers within the register file 401, and each stored in the auxiliary registers 408 and 409. The ALU 410 performs XORing the two four-byte data received from the auxiliary registers 408 and 409, that is, achieves the addition of the corresponding bytes in $GF(2^8)$. The resultant four-byte data obtained by the XORing is stored in the result register 411. The resultant four-byte data is selected by the write multiplexer 412, and stored in the output register indicated by the third operand.

The sequence of the instructions presented in FIG. 13 achieves data processing equivalent to that performed by the processor illustrated in FIG. 7. It should be noted that selecting the input register rs is equivalent to selecting the target column with the column index, and performing the XOR instructions is equivalent to achieving the addition in $GF(2^8)$ by the Galois field adder 109.

The use of the aforementioned AES_SSM instructions effectively reduces the number of necessary instructions for achieving encryption using the AES algorithm. As described above, performing the SubBytes, ShiftRows, and MixColumns transformations for obtaining one column of the output state requires only seven instructions, that is, obtaining the output state requires 28 instructions. This results in that performing ten rounds, which are required to encryption with 128-bit key, requires about 300 instructions including performing the AddRoundKey transformations. The reduction of the number of the required instructions effectively achieves processing speed at least as good as the Gladman's method with reduced hardware for storing the S-box.

4. Modification for Performing Decryption

Minor modifications allow the AES processors in the first and second embodiments to perform decryption with the AES algorithm in place of encryption. First, the values contained in the coefficient table 106 are replaced with the 4-bit elements of the transposed matrix of the coefficient matrix described in equation (5.10) of FIPS 197 as illustrated in FIG. 14. For the row index "0" (or the operand imm being "00"), which selects the first row of the input state 101, the coefficient table 106 sets the coefficients $d_3$, $d_2$, $d_1$, and $d_0$ to the hexadecimal numbers {0e}, {09}, {0d}, and {0b}, respectively. For the row index "1", which selects the second row of the input state 101, the coefficient table 106 sets the coefficients $d_3$, $d_2$, $d_1$, and $d_0$ to the hexadecimal numbers {0b}, {0e}, {09}, and {0d}, respectively. For the row index "2", which selects the third row of the input state 101, the coefficient table 106 sets the coefficients $d_3$, $d_2$, $d_1$, and $d_0$ to the hexadecimal numbers {0d}, {0b}, {0e}, and {09}, respectively. Finally, for the row index "3", which selects the fourth row of the input state 101, the coefficient table 106 sets the coefficients $d_3$, $d_2$, $d_1$, and $d_0$ to the hexadecimal numbers {09}, {0d}, {0b}, and {0e}, respectively.

Second, the S-box 105 is replaced with an inverse S-box illustrated in FIG. 22, as disclosed in FIG. 14 of FIPS 197.

These modifications requires the Galois field multipliers $107_0$ to $107_3$ to be adapted to achieve multiplication of the 8-bit substitution values with the 4-bit coefficients in $GF(2^8)$.

An inverse AES_SSM instruction may be defined for the AES processor in FIG. 10 in place of the AES_SSM instruction in the case that the values of the coefficient table 106 are modified and the S-box 105 is replaced with the inverse S-box table.

FIG. 15 illustrates the result of an inverse AES_SSM instruction developed in the output register rt. When the operand imm of the inverse AES_SSM instruction is set to a value "00", which selects the first row of the input state, the issue of the inverse AES_SSM instruction results in that the bytes bo0 to bo3 are set to InvS-box(bi0)·{0e}, InvS-box(bi0)·{09}, InvS-box(bi0)·{0d}, and InvS-box(bi0){0b}, respectively, where InvS-box(bik) represents the substitution value obtained using the inverse S-box with the byte bik within the input register rs used as the index. Correspondingly, the result of the inverse AES_SSM instruction is obtained as illustrated in FIG. 15 for other rows.

5. Third Embodiment

Figure 16:
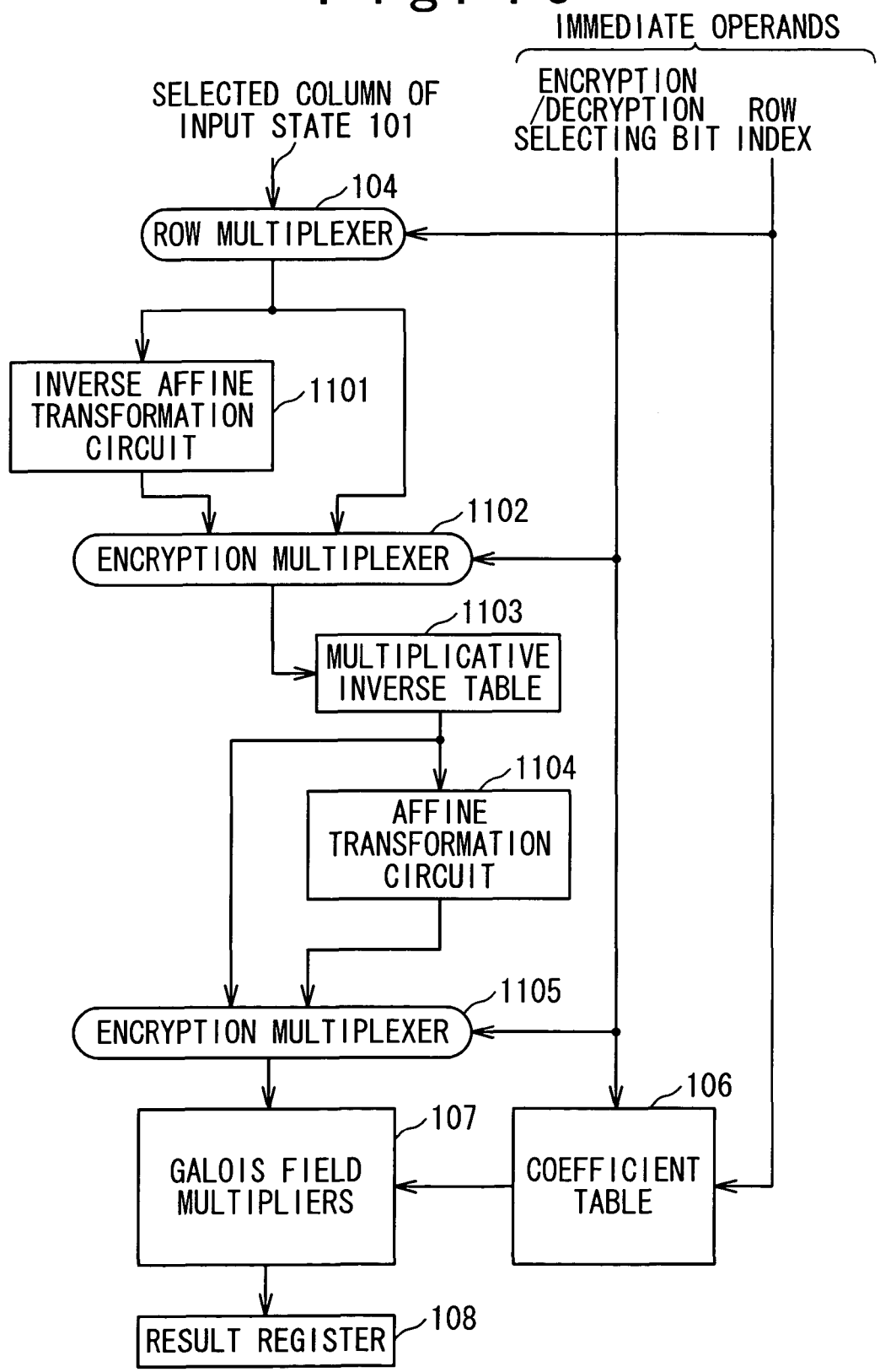
FIG. 16 is a block diagram illustrating a structure of an AES encryption/decryption processor in a third embodiment.

Referring to FIG. 16, in a third embodiment, an AES processor is provided which is adapted to both encryption and decryption using the AES algorithm. This is achieved by replacing the circuitry 111' illustrated in FIG. 10 with the circuitry illustrated in FIG. 16. The AES processor in this embodiment is designed on the basis of the fact that there is no significant difference between encryption and decryption using the AES algorithm.

Referring to FIG. 16, the AES processor in this embodiment includes an inverse affine transformation circuit 1101, an encryption multiplexer 1102, an inverse table 1103, an affine transformation circuit 1104, an encryption multiplexer 1105, a row multiplexer 104, a coefficient table 106, Galois field multipliers 107, and a result register 108.

The row multiplexer 104 receives the four elements of the selected column of the input state 101, and selects one of the four elements.

The encryption multiplexer 1102 selects one of the outputs received from the inverse affine transformation circuit 1101 and the row multiplexer 104, while the encryption multiplexer 1105 selects one of the outputs received from the inverse table 1103 and the affine transformation circuit 1104.

The affine transformation circuit 1104 applies the following affine transformation over $GF(2^8)$:

$$b'_i = b_i \oplus b_{(i+4) mod 8} \oplus b_{(i+5) mod 8} \oplus b_{(i+6) mod 8} \oplus b_{(i+7) mod 8} \oplus c_i, \quad (4)$$

for $0 \leq i \leq 7$, where $b_i$ is the $i^{th}$ bit of the input byte, $c_i$ is the $i^{th}$ bit of a byte c with the value {63}, and $b'_i$ is the $i^{th}$ bit of the output byte.

The inverse affine transformation circuit 1101, on the other hand, applies the following inverse affine transformation over $GF(2^8)$:

$$b'_i = b_{(i+2) mod 8} \oplus b_{(i+5) mod 8} \oplus b_{(i+7) mod 8} \oplus c_i, \quad (5)$$

for $0 \leq i \leq 7$, where $b_i$ is the $i^{th}$ bit of the input byte, $c_i$ is the $i^{th}$ bit of a byte c with the value {05}, and $b'_i$ is the $i^{th}$ bit of the output byte.

The inverse table 1103 is used for taking the multiplicative inverse in $GF(2^8)$. FIG. 23 shows the values contained in the inverse table 1103. A table lookup using the inverse table 1103 with the input byte {xy} used as the index provides the multiplicative inverse of the input byte {xy} in $GF(2^8)$.

The table lookup on the S-box 105 for encryption is equivalently achieved by the table lookup on the inverse table 1103 followed by applying the aforementioned affine transformation with the affine transformation circuit 1104. As described in FIPS 197, Section 5.1.1, the SubBytes transformation is constructed by taking the multiplicative inverse in $GF(2^8)$ followed by applying the aforementioned affine transformation.

Correspondingly, the table lookup on the inverse S-box for decryption is equivalently achieved by applying the aforementioned inverse affine transformation with the inverse affine transformation circuit 1101 followed by the table lookup on the inverse table 1103.

In this embodiment, encryption and decryption are performed in response to an issue of an AES instruction that includes an operator, a first operand indicating the input register, a second operand indicating the output register, and an immediate operand indicating the row of the input state. The immediate operand additionally includes a bit for selecting one of encryption and decryption operations.

When the encryption operation is selected by the selecting bit, the encryption multiplexer 1102 selects the output of the row multiplexer 104, and the encryption multiplexer 1105 selects the output of the affine transformation circuit 1104. The multiplicative inverse of the selected element received from the row multiplexer 104 is obtained using the inverse table 1103, and the aforementioned affine transformation operates on the obtained multiplicative inverse. This results in that the substitution using the S-box 105 is equivalently implemented on the selected element. In addition, in response to the encryption operation being selected by the selecting bit, the coefficient table 106 provides a set of coefficients $d_0$ to $d_3$ as illustrated in FIG. 8, and the multiplication in $GF(2^8)$ is achieved by the Galois field multipliers 107. The products computed by the Galois field multipliers 107 are used for obtaining the four elements of the desired column of the output state.

When the decryption operation is selected by the selecting bit, on the other hand, the encryption multiplexer 1102 selects the output of the inverse affine transformation circuit 1101, and the encryption multiplexer 1105 selects the output of the inverse table 1103. The aforementioned inverse affine transformation operates on the selected element received from the row multiplexer, and the multiplicative inverse of the result of the inverse affine transformation is obtained using the inverse table 1103. This results in that the substitution using the inverse S-box is equivalently implemented on the selected element. In addition, in response to the decryption operation being selected by the selecting bit, the coefficient table 106 provides a set of coefficients $d_0$ to $d_3$ as illustrated in FIG. 14, and the multiplication in $GF(2^8)$ is achieved by the Galois field multipliers 107. The products computed by the Galois field multipliers 107 are used for obtaining the four elements of the desired column of the output state.

The architecture in this embodiment advantageously eliminates a need for including both the S-box and inverse S-box for performing both encryption and decryption; instead, the architecture requires only the inverse table 1103 for performing the SubBytes and InvSubBytes transformations. This effectively reduces hardware of the AES processor.

6. Fourth Embodiment

Figure 17:
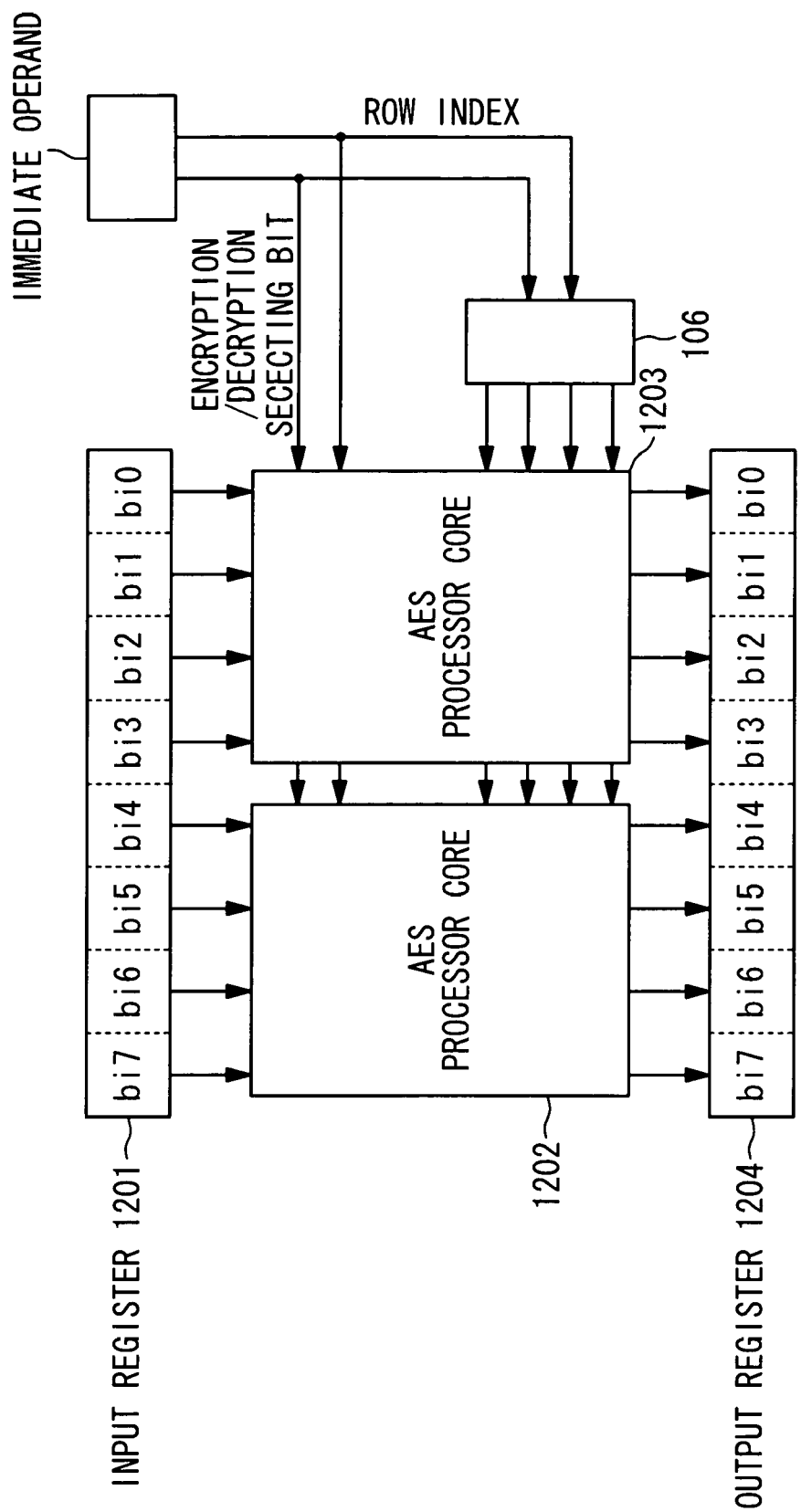
FIG. 17 is a block diagram illustrating a structure of an AES processor in a fourth embodiment.

In a fourth embodiment, as shown in FIG. 17, AES processor cores are multiplexed in an AES processor to achieve parallel processing. This is achieved by replacing the circuitry 111' illustrated in FIG. 10 with the circuitry illustrated in FIG. 17.

In detail, the circuitry illustrated in FIG. 17 includes AES processor cores 1202 and 1203, and a coefficient table 106. A 64-bit (8-byte) input register 1201 and a 64-bit (8-byte) output register 1204 is selected out of the register file in response to the operand rs and rt of the AES instruction. The AES processor cores 1202 and 1203 has the same structure as the circuitry illustrated in FIG. 16 with exception of the coefficient table 106, which are shared by the AES processor cores 1202 and 1203.

The input register 1201 is used for storing two columns to be processed; the two columns may be retrieved from a single input state or from a pair of different input state. The upper four bytes of the input register 1201 are provided for the AES processor core 1202, while the lower four bytes are provided for the AES processor core 1203.

The AES processor cores 1202 and 1203 implements the operations in response to the immediate operand of the AES instruction as described in the third embodiment. The immediate operand selects the row to be operated and the additional selecting bit within the immediate operand selects one of the encryption and decryption operations.

The output register 1204 receives the outputs from the AES processor cores 1202 and 1203. The output received from the AES processor core 1202 is stored as the upper four bytes within the output register 1204, while the output received from the AES processor core 1203 is stored as the lower four bytes.

In this embodiment, the AES processor cores are multiplexed within the AES processor, and this effectively improves processing speed.

It should be noted that an additional AES processor core(s) may be prepared for the AES processor in the case that the bit width of the input and output registers 1201 and 1204 are larger than 64.

7. Conclusion

As thus described, the architecture including the coefficient table 106 and the Galois field multipliers 107 eliminates a need for providing a plurality of S-boxes (or inverse S-boxes) to achieve parallel processing. This effectively achieves reduction of required hardware with improved efficiency.

In addition, the use of the inverse table with the affine and inverse affine transformation circuits advantageously reduces required hardware more effectively.

Although the invention has been described in its preferred form with a certain degree of particularity, it is understood that the present disclosure of the preferred form has been changed in the details of construction and the combination and arrangement of parts may be resorted to without departing from the scope of the invention as hereinafter claimed.

For example, the details of the instruction set may be modified. The row to be operated may be selected the operator itself. That is, four different instructions associated with different rows are provided in place of the AES_SSM instruction. The same goes for the inverse AES_SSM instruction described in Section 4, and the AES instruction described in Section 5.

The input or output states may be stored in a memory in place of the register file. In this case, the operand of the instruction indicates the address of the memory in place of selecting the register.

What is claimed is:

1. An AES encryption processor comprising:
   a selector unit selecting an element of a state in response to row and column indices;
   a substitution unit for obtaining a substitution value with said selected element used as an index;
   a coefficient table providing first to fourth coefficients in response to said row index;
   first to fourth multipliers respectively computing first to fourth products, which are obtained by multiplication of said substitution value with the first to fourth coefficients, respectively, the first to fourth products corresponding to said selected element; and
   an accumulator which accumulates the first to fourth products corresponding to all elements of a column of the state to develop first to fourth elements of a designated column of a resultant state,
   wherein the first to fourth multipliers are Galois field multipliers.

2. The AES encryption processor according to claim 1, wherein said first to fourth coefficients are respectively set
   to {02}, {01}, {01}, and {03} in response to said row index selecting a first row of said state,
   to {03}, {02}, {01}, and {01} in response to said row index selecting a second row of said state,
   to {01}, {03}, {02}, and {01} in response to said row index selecting a third row of said state, and
   to {01}, {01}, {03}, and {02} in response to said row index selecting a fourth row of said state.

3. The AES encryption processor according to claim 1, wherein the selector unit also selects other elements of the state in response to the row and column indices, respectively, and the substitution unit also obtains other substitution values of each of the other selected elements of the state with each of the other selected elements used as an index, respectively.

4. The AES encryption processor according to claim 3, wherein the first to fourth multipliers respectively, also compute other first to fourth products, which are obtained by multiplying said substitution values of the each of the other selected elements with the first to fourth coefficients, respectively, each of the other first to fourth products corresponding to different elements of the state.

5. The AES encryption processor according to claim 1, wherein the accumulator adds the first to fourth products corresponding to all elements of a column of the state to develop first to fourth elements of the designated column of the resultant state.

6. The AES encryption processor according to claim 1, wherein the substitution value is provided to the first to fourth multipliers.

7. An AES encryption processor adapted to an AES instruction including first and second operands respectively selecting input and output registers out of a register file, and an immediate operand selecting a row of a state, said AES encryption processor comprising:
   a selector unit selecting an element of said state in response to said first operand and said immediate operand, said selected element being stored in said input register;
   a S-box for obtaining a substitution value with said selected element used as an index;

a coefficient table providing first to fourth coefficients in response to said immediate operand;

first to fourth Galois field multipliers respectively computing first to fourth products, which are obtained by multiplication of said substitution value with first to fourth coefficients, respectively; and a storing unit for storing said first to fourth products into said output register selected by said second operand.

8. The AES encryption processor according to claim 7, further comprising a processing unit adapted to implement XORing, wherein said AES encryption processor is further adapted to an XOR instruction, and wherein said processing unit implements XORing of values contained in two selected registers of said register file.

9. The AES encryption processor according to claim 7, wherein said first to fourth coefficients are respectively set to {02}, {01}, {01}, and {03} in response to said row index selecting a first row of said state, to {03}, {02}, {01}, and {01} in response to said row index selecting a second row of said state, to {01}, {03}, {02}, and {01} in response to said row index selecting a third row of said state, and to {01}, {01}, {03}, and {02} in response to said row index selecting a fourth row of said state.

10. An AES decryption processor comprising:

a selector unit selecting an element of a state in response to row and column indices;

an inverse S-box for obtaining a substitution value with said selected element used as an index;

a coefficient table providing first to fourth coefficients in response to said row index;

first to fourth Galois field multipliers respectively computing first to fourth products, which are obtained by multiplication of said substitution value with first to fourth coefficients, respectively; and an accumulator which accumulates the first to fourth products to develop first to fourth elements of a designated column of a resultant state.

11. The AES decryption processor according to claim 10, wherein said first to fourth coefficients are respectively set to {02}, {01}, {01}, and {03} in response to said row index selecting a first row of said state, to {03}, {02}, {01}, and {01} in response to said row index selecting a second row of said state, to {01}, {03}, {02}, and {01} in response to said row index selecting a third row of said state, and to {01}, {01}, {03}, and {02} in response to said row index selecting a fourth row of said state.

12. An AES decryption processor adapted to an AES instruction including first and second operands respectively selecting input and output registers out of a register file, and an immediate operand selecting a row of a state, said AES decryption processor comprising:

a selector unit selecting an element of said state in response to said first operand and said immediate operand, said selected element being stored in said input register;

a S-box for obtaining a substitution value with said selected element used as an index;

a coefficient table providing first to fourth coefficients in response to said immediate operand;

first to fourth Galois field multipliers respectively computing first to fourth products, which are obtained by multiplication of said substitution value with first to fourth coefficients, respectively; and a storing unit for storing said first to fourth products into said output register selected by said second operand.

13. The AES decryption processor according to claim 12, further comprising a processing unit adapted to implement XORing, wherein said AES decryption processor is further adapted to an XOR instruction, and wherein said processing unit implements XORing of values contained in two selected registers of said register file.

14. The AES encryption processor according to claim 12, wherein said first to fourth coefficients are respectively set to {02}, {01}, {01}, and {03} in response to said row index selecting a first row of said state, to {03}, {02}, {01}, and {01} in response to said row index selecting a second row of said state, to {01}, {03}, {02}, and {01} in response to said row index selecting a third row of said state, and to {01}, {01}, {03}, and {02} in response to said row index selecting a fourth row of said state.

15. An AES processor comprising:

a first selector unit selecting an element of a state in response to row and column indices;

an inverse affine transformation circuit applying an inverse affine transformation on said selected element;

a second selector unit selecting one out of two data bytes consisting of said selected element received from said first selector, and a result of said inverse affine transformation received said inverse affine transformation circuit, wherein said selected element is selected for encryption, while said result of said inverse affine transformation is selected for decryption;

an inverse determining unit obtaining a multiplicative inverse of said selected data byte received from said second selector;

an affine transformation circuit applying an affine transformation on said obtained multiplicative inverse;

a third selector unit selecting one of two data bytes consisting of said multiplicative inverse received from said inverse determining unit, and a result of said affine transformation received from affine transformation circuit, wherein said result of said affine transformation is selected for decryption, while said multiplicative inverse is selected for encryption;

a coefficient table providing first to fourth coefficients in response to said row index;

first to fourth Galois field multipliers respectively computing first to fourth products, which are obtained by multiplication of said substitution value with first to fourth coefficients, respectively; and an accumulator which accumulates the first to fourth products to develop first to fourth elements of a designated column of a resultant state.

16. An AES processor adapted to an AES instruction including first and second operands respectively selecting input and output registers out of a register file, and an immediate operand selecting a row of a state, said AES processor comprising:

a first selector unit selecting an element of said state in response said first operand and said immediate operand, said selected element being stored in said input register;

an inverse affine transformation circuit applying an inverse affine transformation on said selected element;

a second selector unit selecting one out of two data bytes consisting of said selected element received from said first selector, and a result of said inverse affine transformation received said inverse affine transformation circuit, wherein said selected element is selected for encryption, while said result of said inverse affine transformation is selected for decryption;

an inverse determining unit obtaining a multiplicative inverse of said selected data byte received from said second selector; an affine transformation circuit applying an affine transformation on said obtained multiplicative inverse;

a third selector unit selecting one of two data bytes consisting of said multiplicative inverse received from said inverse determining unit, and a result of said affine transformation received from affine transformation circuit, wherein said result of said affine transformation is selected for decryption, while said multiplicative inverse is selected for encryption;

a coefficient table providing first to fourth coefficients in response to said row index;

first to fourth Galois field multipliers respectively computing first to fourth products, which are obtained by multiplication of said substitution value with first to fourth coefficients, respectively; and a storing unit for storing said first to fourth products into said output register selected by said second operand.

17. The AES processor according to claim 16, further comprising a processing unit adapted to implement XORing, wherein said AES processor is further adapted to an XOR instruction, and wherein said processing unit implements XORing of values contained in two selected registers of said register file.

18. An AES processor adapted to an AES instruction including first and second operands respectively selecting input and output registers out of a register file, and an immediate operand selecting a row of a state(s), said AES processor comprising:

a plurality of AES processor cores respectively associated with a plurality of columns of said state(s); and a coefficient table providing first to fourth coefficients in response to said immediate operand;

wherein each of said plurality of AES processor cores includes: a first selector unit selecting an element of said state(s) in response said first operand and said immediate operand, said selected element being stored in said input register, an inverse affine transformation circuit applying an inverse affine transformation on said selected element, a second selector unit selecting one out of two data bytes consisting of said selected element received from said first selector, and a result of said inverse affine transformation received said inverse affine transformation circuit, wherein said selected element is selected for encryption, while said result of said inverse affine transformation is selected for decryption, an inverse determining unit obtaining a multiplicative inverse of said selected data byte received from said second selector, an affine transformation circuit applying an affine transformation on said obtained multiplicative inverse, a third selector unit selecting one of two data bytes consisting of said multiplicative inverse received from said inverse determining unit, and a result of said affine transformation received from affine transformation circuit, wherein said result of said affine transformation is selected for decryption, while said multiplicative inverse is selected for encryption, first to fourth Galois field multipliers respectively computing first to fourth products, which are obtained by multiplication of said substitution value with first to fourth coefficients, respectively, and a storing unit for storing said first to fourth products into said output register selected by said second operand.

* * * * *

UNITED STATES PATENT AND TRADEMARK OFFICE
CERTIFICATE OF CORRECTION

PATENT NO.      : 7,809,132 B2                               Page 1 of 1
APPLICATION NO. : 10/764504
DATED           : October 5, 2010
INVENTOR(S)     : Nadehara It is certified that error appears in the above-identified patent and that said Letters Patent is hereby corrected as shown below:

Column 11, Line 42: Delete "$S_{2,2}$," and insert -- $S''_{2,2}$, --

Column 14, Line 3: After "$S_{2,2}$," insert -- $S_{1,2}$, --

Signed and Sealed this
Fifteenth Day of February, 2011

David J. Kappos
*Director of the United States Patent and Trademark Office*